United States Patent
Huo et al.

(10) Patent No.: US 12,498,437 B2
(45) Date of Patent: Dec. 16, 2025

(54) SYSTEMS AND METHODS FOR MAGNETIC RESONANCE CONDITIONAL IMPLANT DATA CONFIGURATION AND STORAGE

(71) Applicant: GE Precision Healthcare LLC, Waukesha, WI (US)

(72) Inventors: Yanting Huo, Beijing (CN); Maggie M. Fung, Jersey City, NJ (US); Fan Yang, Beijing (CN); Kun Wang, Beijing (CN); Anand Kumar Venkatachari, Waukesha, WI (US); Benjamin Gray, Waukesha, WI (US); Franco Rupcich, Wauwatosa, WI (US); Arindam Dutta Choudhury, Karnataka (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 176 days.

(21) Appl. No.: 18/497,813

(22) Filed: Oct. 30, 2023

(65) Prior Publication Data
US 2025/0138120 A1    May 1, 2025

(51) Int. Cl.
| | |
|---|---|
| *G01R 33/54* | (2006.01) |
| *A61B 5/00* | (2006.01) |
| *A61B 5/055* | (2006.01) |
| *G16H 30/40* | (2018.01) |

(52) U.S. Cl.
CPC ............ *G01R 33/543* (2013.01); *A61B 5/055* (2013.01); *A61B 5/7475* (2013.01); *G16H 30/40* (2018.01)

(58) Field of Classification Search
CPC .. G01R 33/543; G01R 33/288; G01R 33/546; A61B 5/055; A61B 5/7475; G16H 30/40; G16H 40/63
See application file for complete search history.

(56) References Cited

U.S. PATENT DOCUMENTS

2021/0068699 A1 * 3/2021 Liu .................. A61B 5/061

* cited by examiner

*Primary Examiner* — G.M. A Hyder
(74) *Attorney, Agent, or Firm* — McCoy Russell LLP

(57) ABSTRACT

Methods and systems are herein provided for determining operating conditions of a magnetic resonance (MR) scanner based on data of one or more implants of a patient and storing the data of the one or more implants are provided. In one examples, a method comprises obtaining data of one or more implants of a patient from one or more sources; determining one or more configurations of each of the one or more implants; displaying, via a graphical user interface (GUI), the data and the one or more configurations; determining a recommendation configuration based on the one or more configurations; determining a selected configuration via user input to the GUI; and determining operating conditions of an MRI scanner based on the selected configuration for an MRI exam.

18 Claims, 10 Drawing Sheets

SYSTEMS AND METHODS FOR MAGNETIC RESONANCE CONDITIONAL IMPLANT DATA CONFIGURATION AND STORAGE

FIELD

Embodiments of the subject matter disclosed herein relate to patient care protocol management, and more particularly, to integrated alert management for patient care.

BACKGROUND

Magnetic resonance imaging (MRI), as a medical imaging modality, can obtain images of the human body without using x-rays or other ionizing radiation. MRI uses a magnet having a strong magnetic field to generate a main magnetic field. If a part to be imaged of the human body is positioned within the main magnetic field, nuclear spin associated with hydrogen nuclei in human tissue is polarized so that the tissue of the part to be imaged generates a longitudinal magnetization vector at a macroscopic level. After a radio-frequency field intersecting the direction of the main magnetic field is applied, the direction of rotation of protons changes so that the tissue of the part to be imaged generates a transverse magnetization vector at a macroscopic level. After the radio-frequency field is removed, the transverse magnetization vector decays in a spiral manner until it is restored to zero. A free induction decay signal is generated during decay. The free induction decay signal can be acquired as a magnetic resonance signal, and a tissue image of the part to be imaged can be reconstructed based on the acquired signal. A gradient system is configured to transmit a layer selection gradient pulse, a phase-coded gradient pulse, and a frequency-coded gradient pulse (also referred to as a read-out gradient pulse) to provide three-dimensional position information for the aforementioned magnetic resonance signal to implement image reconstruction.

In recent years, people increasingly tend to have equipment such as medical equipment, orthopedic equipment, plastic equipment, and the like implanted in the body. An implant such as a pacemaker, orthopedic implant equipment, a ventriculoperitoneal (VP) shunt, a puncture device, and the like in the human body, may be affected by the magnetic resonance imaging and/or may affect resultant images. Before scanning, it is usually necessary to obtain parameters relevant to the implant by means of oral inquiry, medical record search, or database search in order to configure operating conditions of the MR scanner.

BRIEF DESCRIPTION

In one example, a method comprises obtaining data of one or more implants of a patient from one or more sources, determining one or more configurations of each of the one or more implants, displaying, via a graphical user interface (GUI), the data and the one or more configurations, determining a recommendation configuration based on the one or more configurations, determining a selected configuration via user input to the GUI, and determining operating conditions of an MRI scanner based on the selected configuration for an MRI exam.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
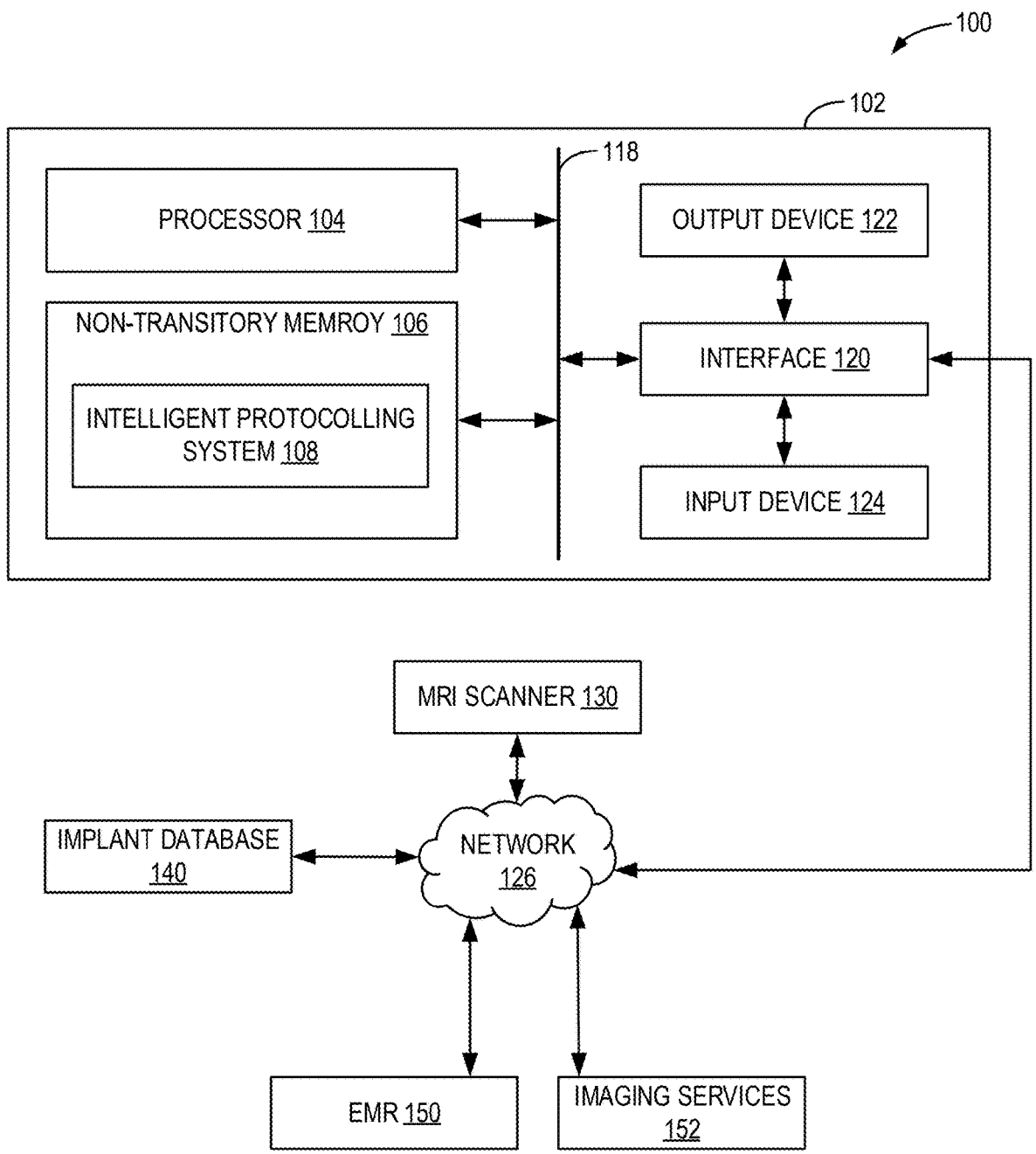
FIG. 1 shows a block diagram of an example computing system.

The following description relates to various embodiments of an intelligent protocolling system. In particular, systems and methods for determining operating conditions of a magnetic resonance imaging (MRI) scanner based on data of one or more implants of a patient and storing the data of the one or more implants are provided. MRI makes use of a magnet to generate a magnetic field in order to obtain images of a subject, such as the body of a human patient. If a part to be imaged of the human body is positioned within the magnetic field, nuclear spin associated with hydrogen nuclei in human tissue is polarized so that the tissue of the part to be imaged generates a longitudinal magnetization vector. After a radio-frequency field intersecting the direction of the magnetic field is applied, the direction of rotation of protons changes so that the tissue of the part to be imaged generates a transverse magnetization. After the radio-frequency field is removed, the transverse magnetization vector decays in a spiral manner until it is restored to zero. A free induction decay signal is generated during decay. The free induction decay signal can be acquired as a magnetic resonance signal, and a tissue image of the part to be imaged can be reconstructed based on the acquired signal.

Subjects being imaged, such as human patients, may in some examples have one or more implanted devices (e.g., implants) that may be affected by the magnetic field of the scanner or may affect the resultant images acquired by the MR scanner. As such is the case, it is often necessary to determine parameters of the implants prior to acquisition in order to configure operating conditions of the MR scanner to reduce these effects. Implanted devices, such as cardiac pacemakers, internal cardiac defibrillators, neurostimulators (e.g., deep brain stimulators (DBS), vagal nerve stimulators, sacral nerve stimulators, etc.), ventriculoperiotoneal (VP) shunts, and more may be MR conditional. Other implants, such as certain clips, such as ferromagnetic clips used for cerebral aneurysms, may not be compatible with MRI under any conditions. MR conditional implants may enter an MRI scanner only under specific conditions corresponding to the implant itself and those conditions demand to be met in order for the patient to be imaged. Parameters that may be met for an implant may include, but are not limited to, static field strength, maximum spatial field gradient, dB/dt limitations, specific absorption rate (SAR), type of radiofrequency (RF) coils, and more. As an example, for a DBS, if the conditions set for by the specific DBS implant are not met, component heating, especially to lead electrodes, may occur.

In order to meet the conditions for one or more specific implants, personnel, such as referring physicians, administrators, MR supervisors, and MR technicians, often spend large amounts of time determining the parameters for the implants. This may result in delays in scheduling a scan and acquiring the scan which in turn may result in delayed diagnoses. Implant data of these parameters is often disparately stored and not tied to a patient's record. As such, searching for implant parameter specifics may be repeated for each MR scan a patient is scheduled for as the data is not logged and stored in an easy to access way. Further, while companies may have databases of their respective implants, the data is not stored as usable for later reference by the medical personnel.

Additionally, determining MR operating conditions when a patient has more than one implant may be cumbersome and time consuming. In such a case, multiple sets of parameters are to be determined and in order for the MR operating conditions to meet the specifications of each of the more than one implants, the parameters are manually compared to one another to determine operating conditions that meets each implant's demands. Determining a configuration for more than one implant may be time consuming and frustrating for the personnel, especially if data of one or more of the implants is difficult to track down.

Described herein are systems and methods for MR conditional implant data configuration and storage that address the aforementioned issues with determining operating conditions of an MRI scanner based on parameters of one or more implanted devices. By obtaining parameters and configurations of each of one or more implants from one or more sources, a recommendation configuration may be determined and the data of the implants may be saved directly to a corresponding patient record, an implant database, and/or to an MRI scanner via which a corresponding patient may be imaged according to a selected configuration. In this way, time spent in determining implant data, reformatting implant data, and determining appropriate operating conditions of an MRI scanner may be reduced.

Figure 2:
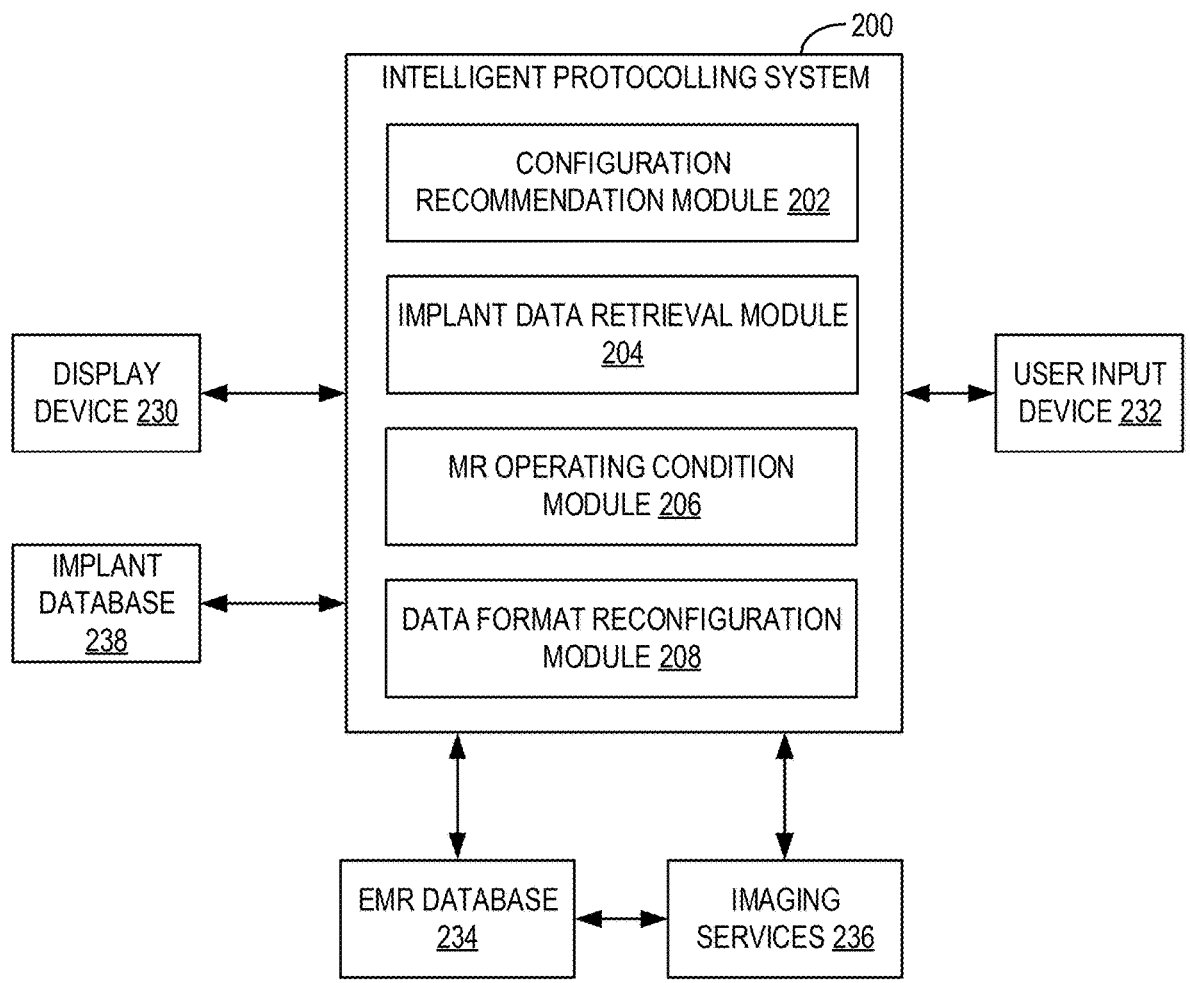
FIG. 2 shows a block diagram of an example intelligent protocolling system.
Figure 3:
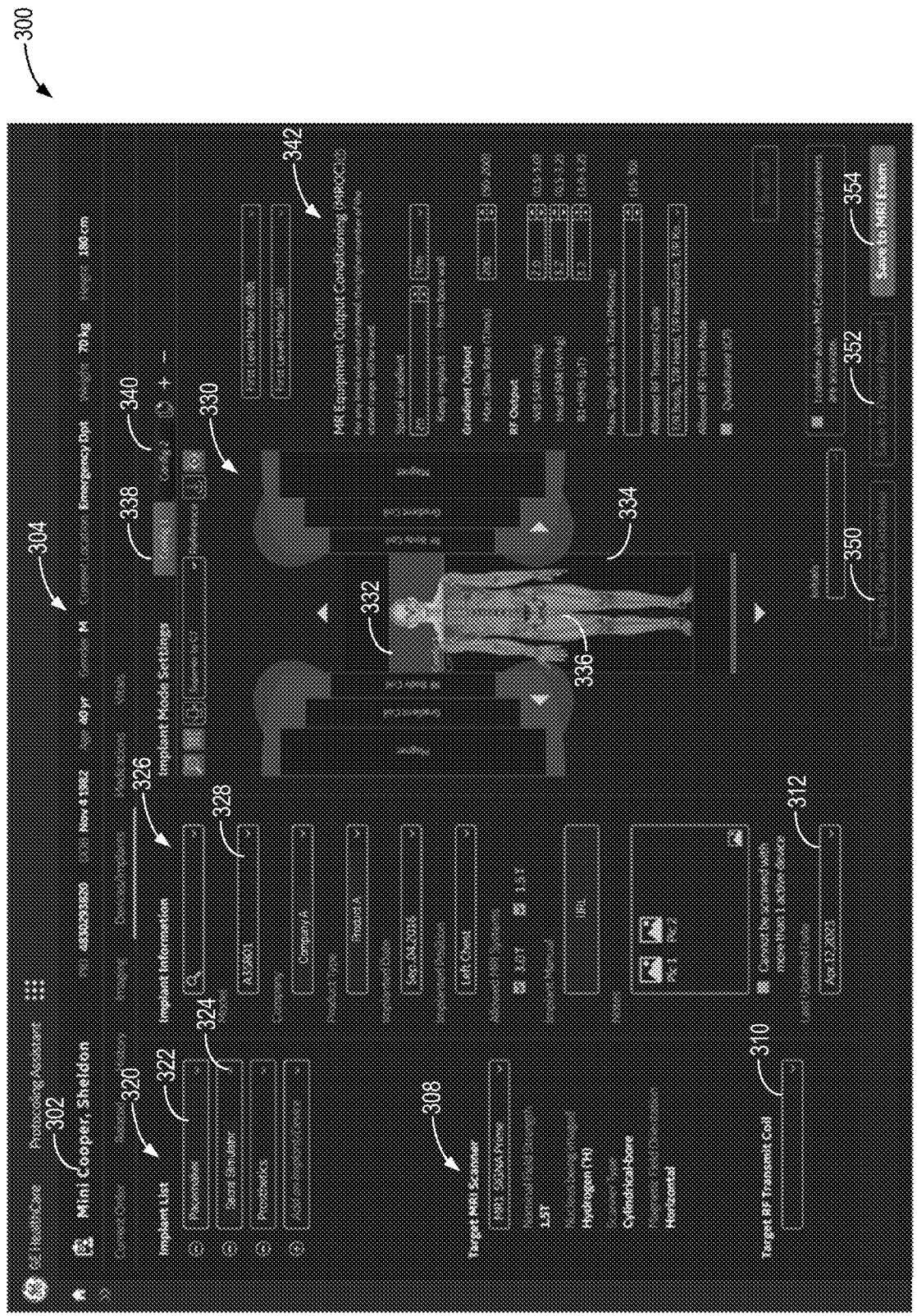
FIG. 3 shows an example first graphical user interface (GUI) displaying information of a first implant.
Figure 4:
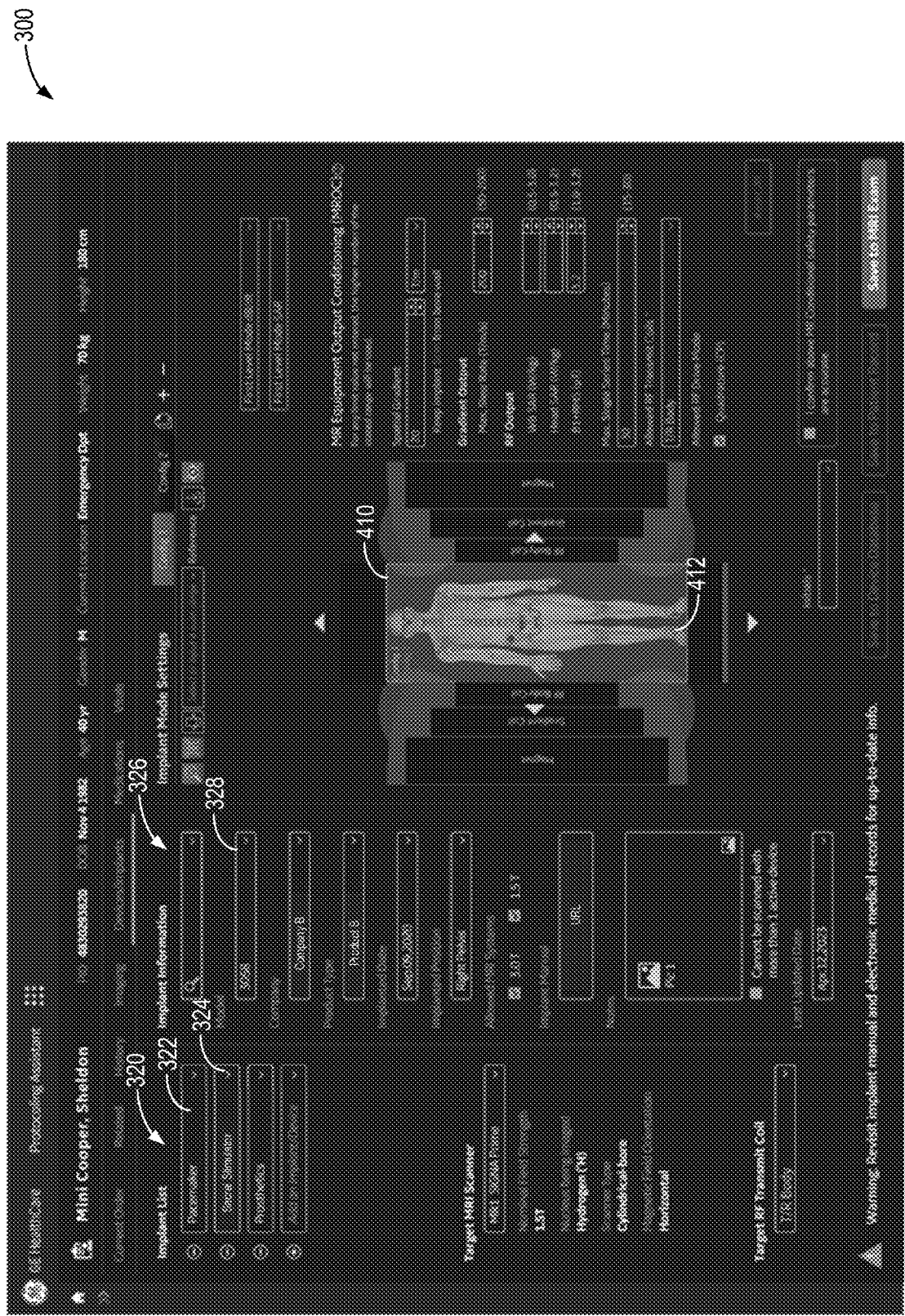
FIG. 4 shows the example first GUI of FIG. 3 displaying information of a second implant.
Figure 5:
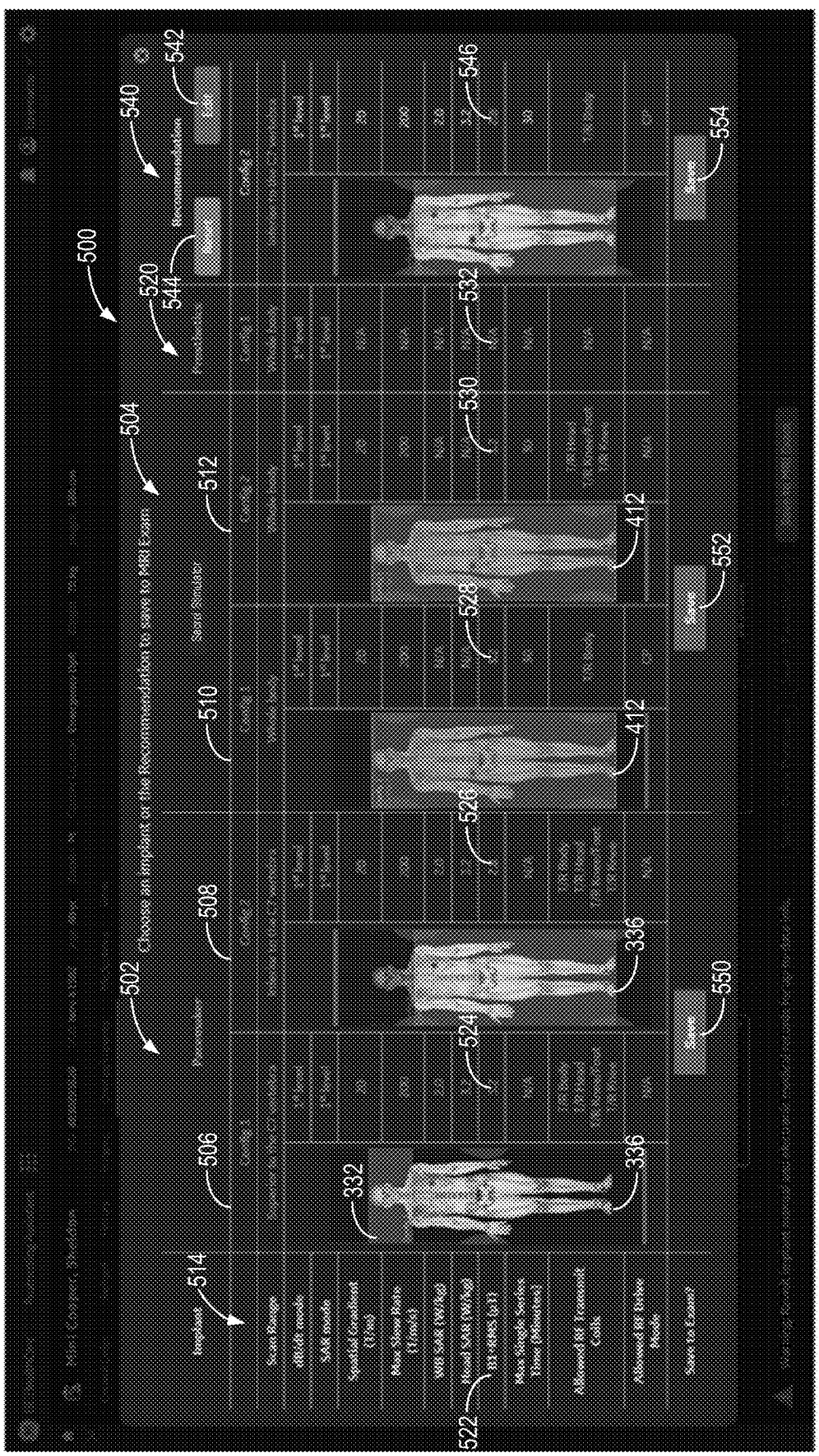
FIG. 5 shows an example second GUI for selecting a configuration to be saved to an MRI scanner.
Figure 6:
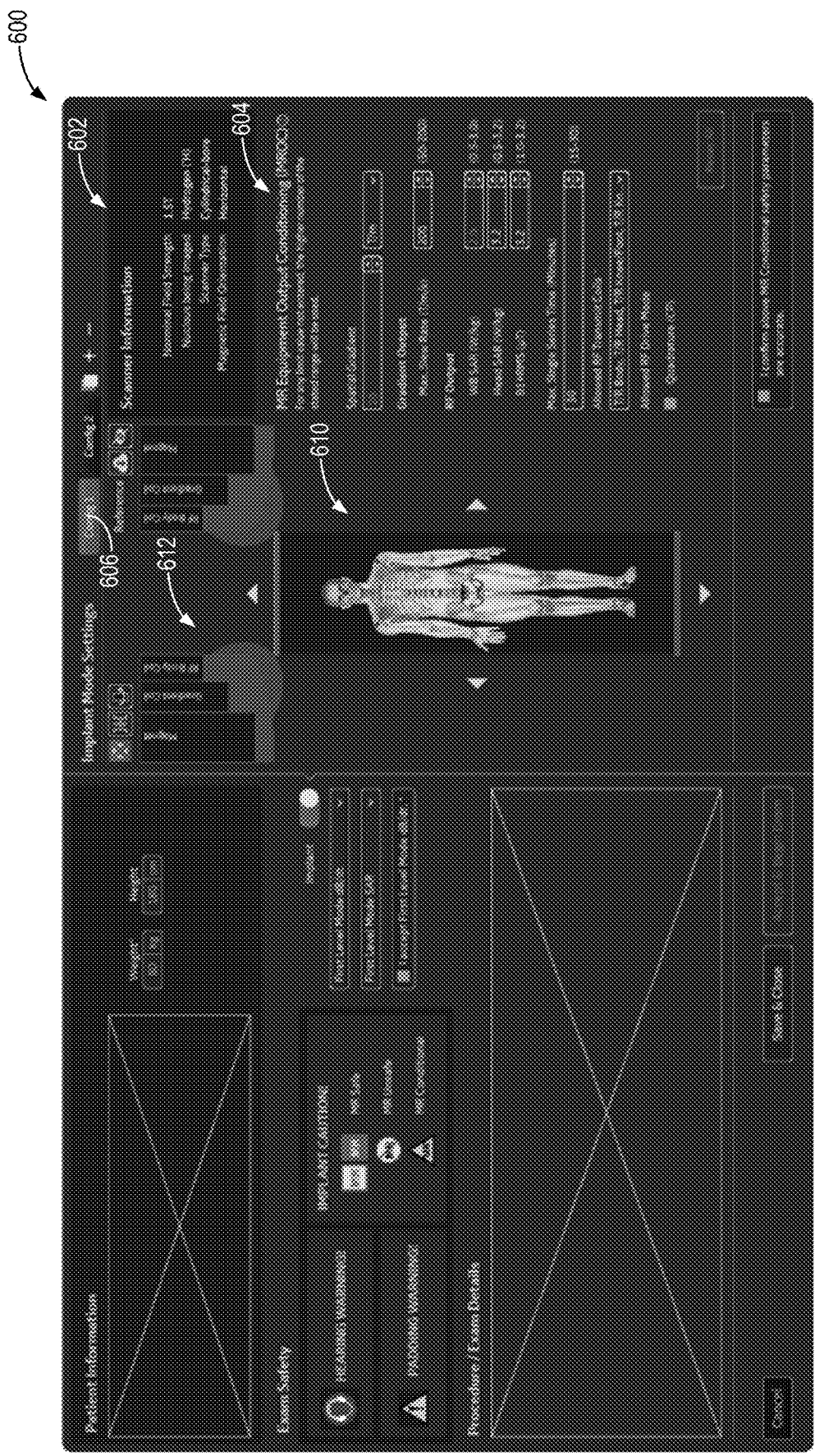
FIG. 6 shows an example third GUI of an MRI scanner showing operating conditions determined based on a selected configuration.
Figure 7:
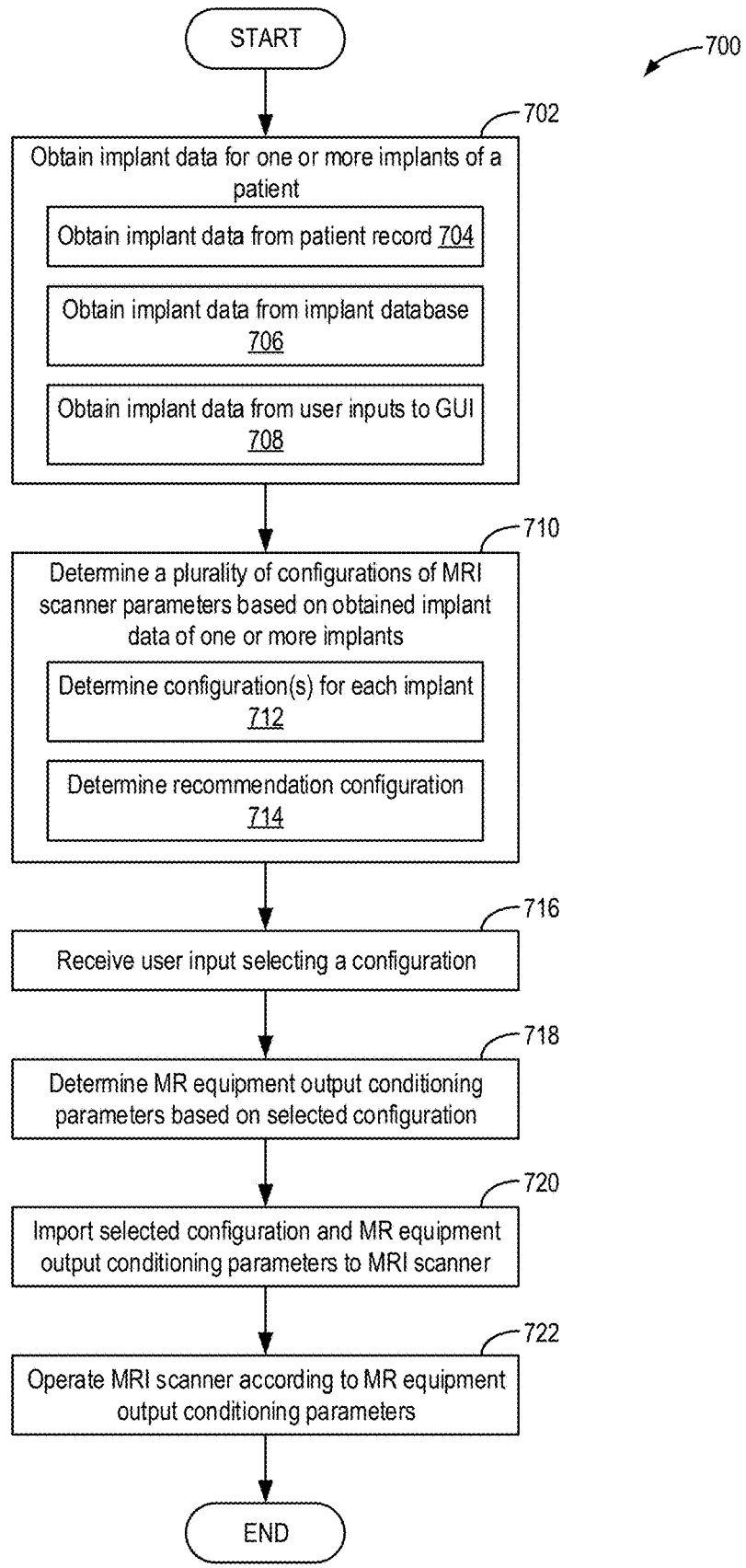
FIG. 7 shows a flowchart illustrating a method for determining MR operating conditions based on one or more implants.
Figure 8:
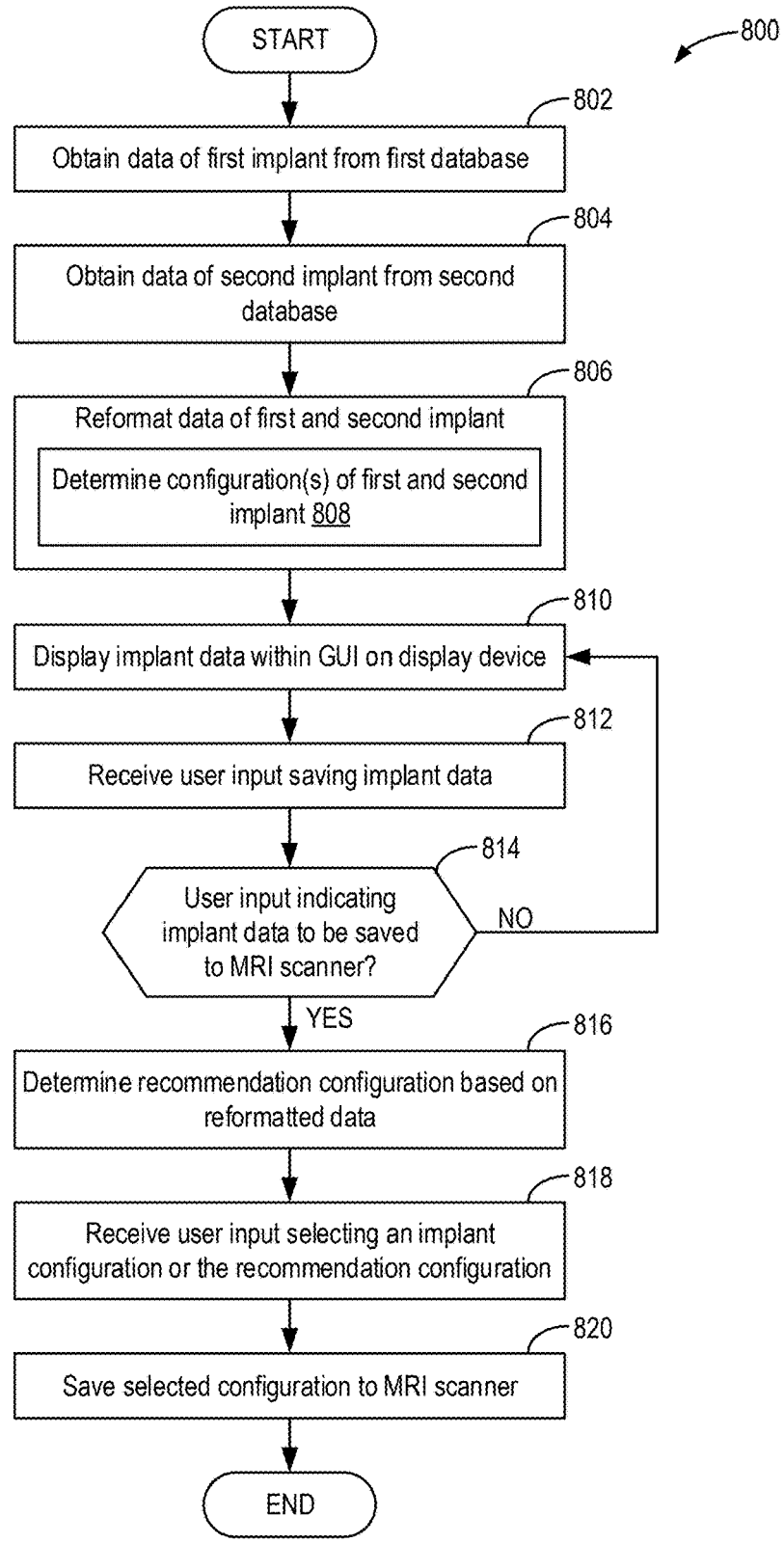
FIG. 8 shows a flowchart illustrating a method for determining MR operating conditions based on data of two or more implants obtained from two or more different implant databases.
Figure 9:
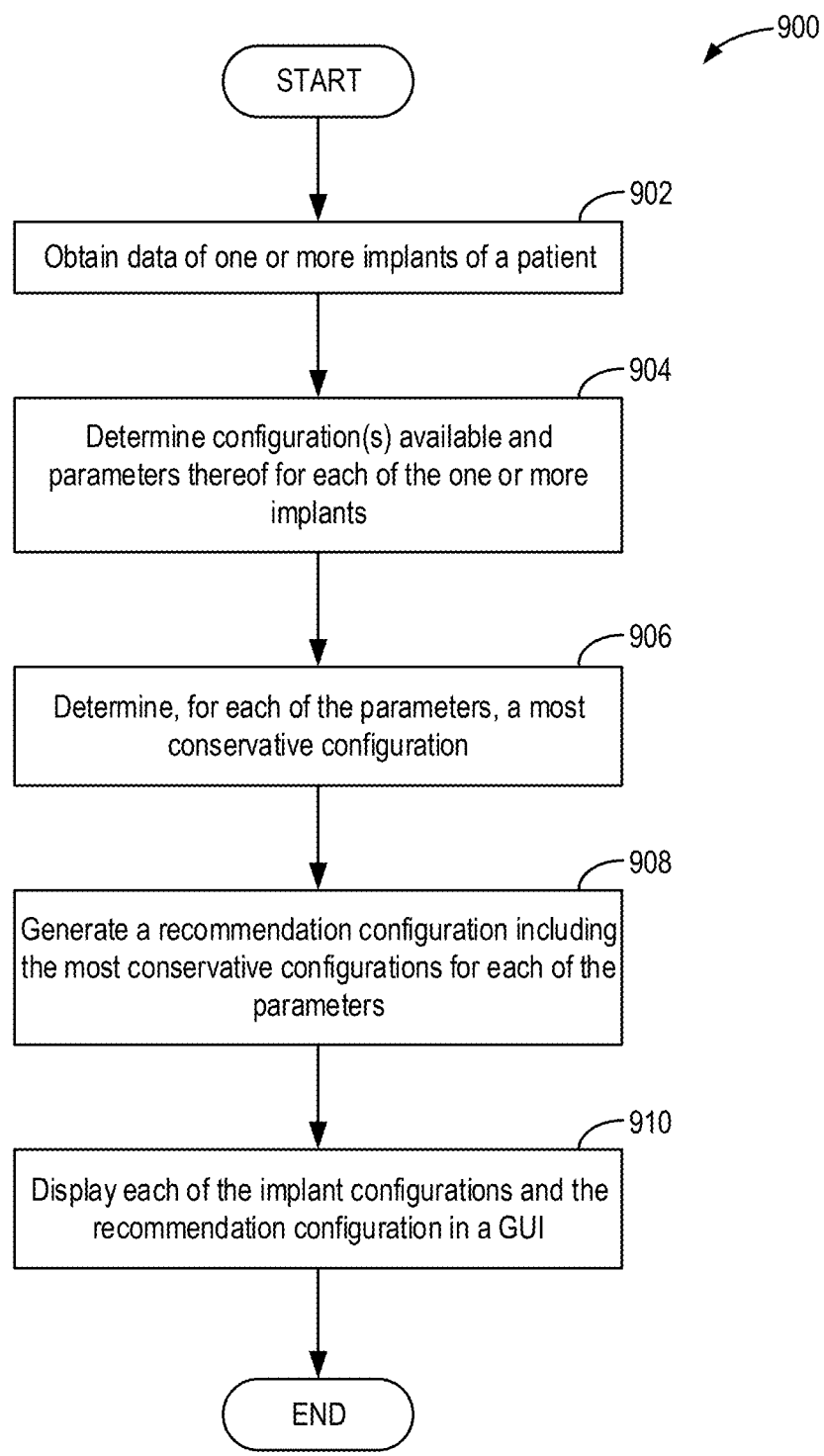
FIG. 9 shows a flowchart illustrating a method for determining a recommendation configuration.
Figure 10:
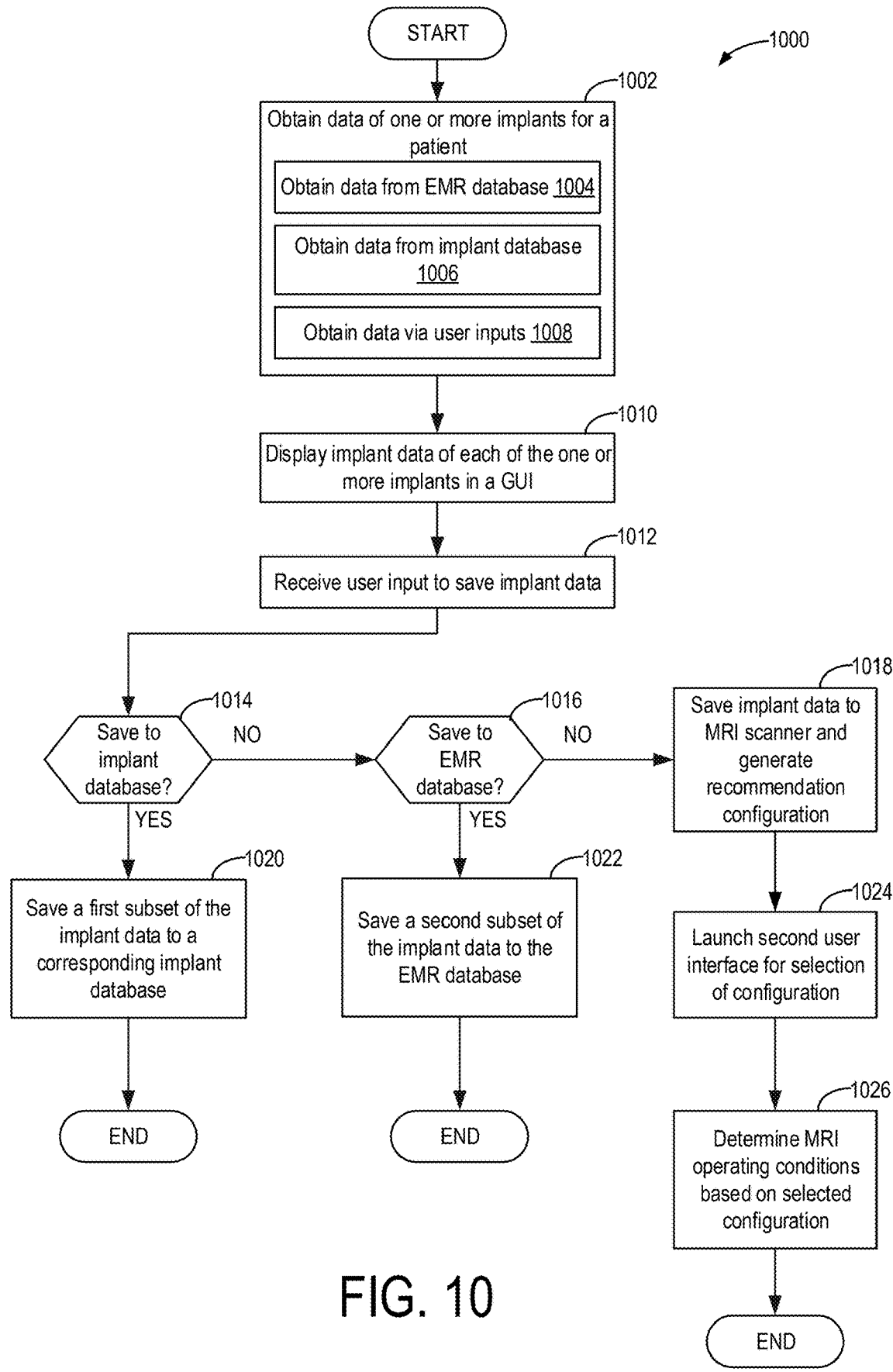
FIG. 10 shows a flowchart illustrating a method for saving data to an implant database, a patient record, and/or an MRI scanner.

The methods and systems as herein presented will now be described by way of example with reference to the figures. FIG. 1 shows an example of a computing system. FIG. 2 shows an example of an intelligent protocolling system. FIGS. 3 and 4 show examples of a first graphical user interface (GUI) with a first and second implant selected, respectively. FIG. 5 shows an example of a second GUI through which a user may select a configuration. FIG. 6 shows a third GUI of an MRI scanner. FIG. 7 illustrates a method for obtaining implant data and determining MR operating conditions therefor. FIG. 8 illustrates a method for obtaining and reformatting implant data from a plurality of sources. FIG. 9 illustrates a method for determining a recommendation configuration. FIG. 10 illustrates a method for saving implant data to one of a patient record, an implant database, and an MRI scanner.

Referring now to FIG. 1, an example of a computing system 100 is shown. Computing system 100 may comprise a computing device 102, which may comprise, as illustrative and non-limiting examples, a server, a personal computer, a workstation, a mobile device (e.g., a cellular phone, a smart phone, a computing tablet, and so on), or any other type of computing device.

The computing device 102 includes one or more processors 104 which may be configured to execute machine-readable instructions stored in non-transitory memory 106. Processor(s) 104 may be single core or multi-core, and the programs executed thereon may be configured for parallel or distributed processing. In some embodiments, the processor(s) 104 may optionally include individual hardware components that are distributed throughout two or more devices, which may be remotely located and/or configured for coordinated processing. In some embodiments, one or more aspects of the processor(s) 104 may be virtualized and executed by remotely-accessible networked computing devices configured in a cloud computing configuration. The computing device 102 further includes non-transitory memory 106. It should be appreciated that the computing device 102 may include additional memory devices, including volatile memory, mass storage, local memory, and so on.

Memory 106 includes one or more data storage structures, such as optical memory devices, magnetic memory devices, or solid-state memory devices, for storing programs and routines executed by processor(s) 104 to carry out various functionalities disclosed herein. Memory 106 may include any desired type of volatile and/or non-volatile memory such as, for example, static random access memory (SRAM), dynamic random access memory (DRAM), flash memory, read-only memory (ROM), etc. Processor(s) 104 may be any suitable processor, processing unit, or microprocessor, for example. Processor(s) 104 may be multi-processor system, and, thus, may include one or more additional processors that are identical or similar to each other and that are communicatively coupled via an interconnection bus. In some examples, memory 106 may include components disposed at two or more devices, which may be remotely located and/or configured for coordinated processing. In some embodiments, one or more aspects of memory 106 may include remotely-accessible networked storage devices configured in a cloud computing configuration. The processor(s) 104 and memory 106 may be coupled, for example, via a communications bus 118.

The computing device 102 may further include an interface 120 communicatively coupled to the processor(s) 104 and memory 106 via the communications bus 118. The interface 120 may be implemented by one or more of any type of interface standard, such as an Ethernet interface, a universal serial bus (USB), a BLUETOOTH interface, a near field communication (NFC) interface, and/or a PCI express interface.

The computing device 102 may further include one or more output device(s) 122 communicatively coupled to the processor(s) 104 and the non-transitory memory 106 via the interface 120. The output device(s) 122 may comprise, for example, one or more display devices. Such a display device may include one or more display devices utilizing virtually any type of technology (e.g., a light emitting diode (LED), an organic light emitting diode (OLED), a liquid crystal display (LCD), a cathode ray tube (CRT) display, an in-place switching (IPS) display, a touchscreen, and so on). In some examples, output device 122 may comprise a computing monitor configured to display medical information of various types and styles, such as presented in a GUI. Output device(s) 122 may be combined with processor(s) 104, memory 106, and/or user input device(s) 124 in a shared enclosure, or may be a peripheral display device and may comprise a monitor, touchscreen, projector, or other output device known in the art, which may enable a user to plan and administer radiation therapy according to one or more examples of the current disclosure, and/or interact with various data stored in memory 106.

The computing device 102 may further include one or more user input device(s) 124 coupled to the processor(s) 104 and memory 106 via the interface 120. The user input device 124 may comprise, for example, one or more of a touchscreen, a keyboard, a mouse, a trackpad, a motion sensing camera, a microphone, or other device configured to enable a user to interact with and manipulate data within computing device 102.

The interface 120 may further include a communication device such as a transmitter, a receiver, a transceiver, a modem, a residential gateway, a wireless access point, and/or a network interface to facilitate exchange of data with external machines (e.g., computing devices of any kind) via a network 126. For example, the communication may be via, for example, an Ethernet connection, a digital subscriber line (DSL) connection, a telephone line connection, a coaxial cable system, a satellite system, a line-of-site wireless system, a cellular telephone system, and so on. As a non-limiting example, FIG. 1 shows a plurality of devices/systems that may be communicatively coupled to computing device 102 via network 126, including an MRI scanner 130, an implant database 140, an electronic medical record (EMR) 150, and imaging services 152.

Computing device 102 may further include an intelligent protocolling system 108 saved in memory 106. The intelligent protocolling system 108 may be configured to obtain data of one or more implants of a patient, wherein the data includes one or more configurations for a plurality of parameters for each of the one or more implants, as will be further described below. The data of the one or more implants may be stored in the implant database 140, the EMR 150, and/or the imaging services 152. The intelligent protocolling system 108 may be further configured to determine a recommendation configuration based on a plurality of parameter configurations of one or more implants. The recommendation configuration may comprise a recommended set of parameter configurations, the recommended set including a parameter configuration for each of a plurality of parameters. A configuration of parameters may be selected via the intelligent protocolling system 108 and sent to the MRI scanner 130. Additional information about obtaining implant data, determining a recommendation configuration, and saving implant data to the implant database 140, the EMR 150, and/or the MRI scanner 130 is presented below with respect to FIGS. 7-10.

The imaging services 152 may include a radiology information system (RIS), a picture archive and communication system (PACS), and/or other computing devices associated with diagnostic imaging, including computing devices associated with and configured to control diagnostic imaging scanners. The computing devices comprising the imaging services 152 may manage scheduling of diagnostic imaging exams, recommend and execute scanning protocols to perform diagnostic imaging exams, process imaging data to generate images and/or imaging volumes, save diagnostic images/volumes in memory, process diagnostic images/volumes to segment anatomical regions of interest, etc. Specifically, the RIS may be configured to track and manage radiology requests and workflow (e.g., MRI, CT, and other imaging requests and workflow) and the PACS may be configured to store diagnostic images obtained during diagnostic imaging sessions (e.g., images obtained during a simulation scan). The imaging services 152 may receive information from the intelligent protocolling system 108, such as a determined recommendation configuration for a set of implants to be used to determine MR operating conditions, which may be sent to the MR scanner, as previously noted.

The implant database 140 may store data of a plurality of implants. For example, the implant database 140 may store data of an implant's model number, associated company/producer, a product type, allowed MRI systems (e.g., 3.0 T vs 1.5 T), a link to an implant manual, as well as one or more sets of configurations for a plurality of parameters including dB/dt mode, SAR mode and SAR for various body regions, maximum single series time, allowed RF transmit coils, and the like. In some examples, the data stored in the implant database 140 may not be specific to particular patients and may therefore not include data of implant date, implant site, or serial number. In other examples, the implant database 140 may include patient specifics, for example in such instances the implant database 140 may be linked to the EMR database 150.

The EMR database 150 may store EMRs for a plurality of patients. An EMR for a patient may include patient demographic information, family medical history, past medical history, lifestyle information, comorbidities (e.g., preexisting medical conditions), current medications, allergies, surgical history, past medical screenings and procedures, past hospitalizations and visits, etc. EMR database 150 may be an external database accessible via a secured hospital interface, or EMR database 150 may be a local database (e.g., housed on a device of the hospital). EMR database 150 may be a database stored in a mass storage device configured to communicate with secure channels (e.g., HTTP and TLS), and store data in encrypted form. Further, the EMR database is configured to control access to patient electronic medical records such that only authorized healthcare providers may edit and access the electronic medical records. Additionally, information from the EMR database 150 may be retrieved with the intelligent protocolling system 108 and used to autofill the details of an implant of a patient if the data of the implant is stored in the EMR database 150 for the patient.

While not shown in FIG. 1, one or more workstations may also be communicatively coupled to the computing device 102 via network 126. Each workstation may include a processor, memory, communication module, user input device, display (e.g., screen or monitor), and/or other subsystems (similar to the process, memory, communication module, user input device, and output device of computing device 102) and may be in the form of a desktop computing device, a laptop computing device, a tablet, a smart phone, or other device. Each workstation may be adapted to send and receive encrypted data and display medical information, including medical images in a suitable format such as digital imaging and communication in medicine (DICOM) or other standards. As will be explained in more detail below, the workstations may display GUIs described herein and may facilitate user interaction with the GUIs.

The intelligent protocolling system 108 may fetch data stored in various data sources, aggregate the data, and share the data with various downstream devices, as will be described with respect to FIG. 2. The intelligent protocolling system 108 may employ one or more connectivity methods. The connectivity methods may include DICOM images, DICOM SRs, HL7, FHIR, proprietary logs associated with a manufacturer or operating system, and so on. Thus, the computing device 102 may be operably coupled to the data sources/downstream devices (e.g., imaging services 152, implant database 140, MRI scanner 130, and EMR database 150) via wired connections, wireless connections, and/or any method for communicably connecting systems. As described herein, "operably coupled" is to be understood as coupling of elements via connectivity methods (e.g., wired connection, wireless connection, and so on) which enable transfer of data, signals, requests, and/or other information among the operably coupled elements.

It should be understood that computing system 100 shown in FIG. 1 is illustrative and non-limiting, and that another appropriate computing system 100 may include more, fewer, or different components. The various systems included in computing system 100 (e.g., the computing device 102, imaging services 152, implant database 140, MRI scanner 130, and EMR database 150) may separate devices in communication, as shown in FIG. 1. One or more of the devices described herein may be implemented over a cloud or other computer network. For example, computing device 102 is shown in FIG. 1 as constituting a single entity, but it is to be understood that computing device 102 may be distributed across multiple devices, such as across multiple servers. Further, while the intelligent protocolling system 108 is shown as being included as part of computing device 102, in some examples, intelligent protocolling system 108 may be included as part of one or more other devices, such as implemented as part of imaging services 152.

Turning now to FIG. 2, an intelligent protocolling system 200 is shown. Intelligent protocolling system 200 may be the intelligent protocolling system 108 of FIG. 1 and may be implemented as part of a computing system, such as computing system 100, communicably coupled to an input device, an MRI scanner, an implant database, and an EMR database. However, in other embodiments, the intelligent protocolling system 200 may be disposed at a device (e.g., a server, edge device, etc.) communicably coupled to the computing system via wired and/or wireless connections. In some examples, at least a portion of the intelligent protocolling system 200 may be disposed at a separate device (e.g., a workstation) which can receive and/or obtain data from various databases, such as an EMR database 234, imaging services 236, and/or an implant database 238. Intelligent protocolling system 200 may be communicably coupled to a user input device 232 and a display device 230. The user input device 232 may, in some examples, be the input device 124 and the display device 230 may be the output device 122 of computing system 100 of FIG. 1.

Intelligent protocolling system 200 may include a plurality of modules that store instructions executable by a processor (e.g., a processor of the intelligent protocolling system 200 and/or the processor 104 of the computing system 100 of FIG. 1) and/or include processors for executing various actions, including a configuration recommendation module 202, an implant data retrieval module 204, MR operating condition module 206, and a data format reconfiguration module 208 stored in non-transitory memory. The implant data retrieval module 204 may store instructions for obtaining data of one or more implants corresponding to a patient. In some examples, the implant data retrieval module 204 may store instructions for obtaining data from the implant database 238 in response to indication of an implant model and company, for example via user input. In other examples, the implant data retrieval module 204 may store instructions for obtaining data from the EMR database 234 when implant data is stored in the EMR database 234 for a corresponding patient. In yet further examples, the implant data retrieval module 204 may store instructions for obtaining data via user inputs to a GUI. The data obtained via the implant data retrieval module 204 may include implant model, company/manufacturer, product type, implanted date, implanted position, allowed MRI systems, a link to an implant manual, a link to a picture of the implant, a last updated date, and a plurality of parameter configurations. In some examples, the plurality of parameter configurations may comprise more than one configuration per parameter for a given complaint, for example more than one set of configurations may correspond to a given implant and be retrieved by the implant data retrieval module 204.

The configuration recommendation module 202 may store instructions for determining a recommendation configuration for a set of implants for a patient based on the plurality of parameters retrieved by the implant data retrieval module 204. The recommendation configuration may comprise a recommended set of parameter configurations. As will be further described with respect to FIG. 9, the configuration recommendation module 202 may store instructions for determining a lowest or otherwise most conservative parameter configuration for each of the parameters when generating the recommendation configuration in order to determine a recommendation that meets the minimum parameters for each implant.

The MR operating condition module 206 may store instructions for determining, from a configuration selected for a particular patient, MR equipment output conditioning parameters to be used when acquiring MR images of the patient for a corresponding ordered MRI exam.

The data format reconfiguration module 208 may store instructions for reformatting data obtained from various sources into another format which the intelligent protocolling system 200 may process. The data format reconfiguration module 208 may be part of the system's hardware, firmware, or other software by which incoming obtained data may be analyzed and reformatted if needed prior to being processed via other modules. For example, the implant data retrieval module 204 may store instructions for obtaining data from a first implant company's database that stores data in a first format and from a second implant company's database that stores data in a second, different format. As an example, the first implant company may store data as C-code data and the second implant company may store data as GTIN (Global Trade Item Number) data. The data format reconfiguration module 208 may reconfigure the data from both sources into a third format, or into one of the first and second formats, in order for the configuration recommendation module 202 and the MR operating condition module 206 to make use of the data. For example, the intelligent protocolling system 200 may reformat C-code data and GTIN data into UDI (Unique Device Identifier) code data.

As an example, the first format may comprise a code including device name and year implanted (e.g., NameYear) while the second format may comprise a code including company, device name, and date with the date as a combination of text and numerals (e.g., CompanyNameDayMonthYear). The third format may comprise a code including company, device name, and year (e.g., CompanyNameYear). The intelligent protocolling system 200 may obtain data in the first and/or second formats from respective databases and reformat them into the third format using the information obtained from the databases. The intelligent protocolling system 200 may then store and provide the obtained information in the third format to the computing system to determine recommendation configurations and determine MR operating conditions.

Turning now to FIG. 3, an example of a first GUI 300 is shown. The first GUI 300 may be displayed on a display device, such as display device 230 of FIG. 2, in communication with an intelligent protocolling system, such as intelligent protocolling system 200 of FIG. 2. The first GUI 300 may display implant configurations, MR equipment output conditioning parameters, etc.

The first GUI 300 may include demographic data 304 of a selected patient 302. The selected patient 302 may have one or two implanted devices implanted in their body. The first GUI 300 may display an implant list 320 that includes each implant of the selected patient 302. The implant list 320 may include a plurality of drop down menus through which the implants of the selected patient 302 may be selected. For example, a selectable element of a first implant 322 of the implant list 320 may be selectable to launch a drop down menu through which the first implant 322 of the selected patient 302 may be selected. A selectable element of a second implant 324 of the implant list 320 may be selectable to launch a second drop down menu through which a second implant 324, if present, of the selected patient 302 may be selected. The second drop down menu may exclude the first implant 322 that was selected. The first implant 322, the second implant 324, and other implants of the implant list 320 may be selectable in order to display data corresponding to the respective implant.

As an example, the first implant 322 is shown as selected in FIG. 3. The first implant 322 may be, in this instance, a pacemaker. When the first implant 322 is selected, the first GUI 300 may display implant information 326 and configuration representations 330 corresponding to the first implant 322. The implant information 326 may include a plurality of parameters of the corresponding implant, each listed within a selectable element. For example, selectable element 328 detailing a model of the corresponding implant may launch a drop down menu through which a model may be selected via user input. In this way, specifics of the implant, including model, company/manufacturer, product type, implanted date, implanted position, a link to the implant manual, and a link to one or more photos of the implant, may be entered manually into the system via user inputs. Alternatively and/or additionally, one or more of the plurality of parameters of the corresponding implant may be autopopulated based on obtained data of the implant from an EMR database and/or an implant database. In other examples, a combination of manual inputs and autopopulated inputs may be used to define parameters of the implant based on what data is available within implant databases and/or EMR databases and which data is obtained through manual means (e.g., MR personnel using a physical card from the patient to determine parameters if data is not stored in a connected database/source).

The first GUI 300 may further include a target MRI scanner element 308 and a target RF transmit coil element 310. The target MRI scanner element 308 may indicate type of MRI scanner that is to be used to acquire images of the patient. The target MRI scanner element 308 may comprise a drop down menu through which user input may indicate the type of scanner via a drop down menu. The target RF transmit coil element 310 may indicate a target RF transmit coil for the MRI scanner and may comprise a drop down menu through which the user may indicate a coil, similar to as described with respect to the implant information 326. In some examples, the target MRI scanner element 308 and/or the target RF transmit coil element 310 may be autopopulated by the system based on the implant information or other known factors. A last updated date 312 indicating a most recent date in which the implant information was updated may also be selectable via user input or autopopulated based on obtained data.

The selected implant from the implant list 320, in this case the first implant 322, may include one or more configurations thereof depending on the type of implant, position of the implant, and how MR imaging affects the implant. For example, for a pacemaker, a first configuration may include parameter recommendations including a scan range that comprises the head and neck (e.g., superior to the C7 vertebra) while a second configuration may include parameter recommendations including a scan range that comprises the rest of the body (e.g., inferior to the C7 vertebra). In this way, a configuration may be chosen to define MR equipment output conditioning based on the type of scan being performed, for example using the first configuration for a brain MRI and using the second configuration for a lumbar spine MRI.

The representations 330 may include a representation 336 of the patient's body with shaded areas for each of the configurations' respective scan ranges of the selected implant overlying a respective area of the body that the scan range corresponds to. For example a first shaded area 332 may correspond to the first configuration scan range and a second shaded area 334 may correspond to the second configuration scan range. The first configuration may be selected via first configuration element 338. The second configuration may be selected via a second configuration element 340. Based on which of the configurations is selected via a corresponding element, different parameters of the MR equipment output conditioning 342 may be displayed. Further, depending on which configuration element is selected, either the first or second shaded area 332, 334 may be highlighted. For example, in the example depicted in FIG. 3, the first configuration element 338 is selected and therefore the first shaded area 332 corresponding to the first configuration of the first implant is highlighted (e.g., shaded yellow) and the second shaded area 334 is not highlighted (e.g., shaded blue).

Various save options may be available from within the first GUI 300. For example, a first save element 350 may allow a first subset of the implant data to be saved to a device database (e.g., an implant database). A second save element 352 may allow a second subset of the implant data to be saved to a patient record (e.g., a corresponding patient EMR). In some examples, the first and second save elements 350, 352 may be selected to save respective subsets of the implant data without departing from the first GUI 300. A third save element 354, however, when selected via user input may launch a separate GUI window, as will be described with respect to FIG. 5. The third save element 354 may allow the implant data to be saved to an MRI scanner for a specified MRI exam.

A given patient may have had an order for an MRI exam noted in an imaging service, such as RIS, prior to the launching of the first GUI 300. The third save element 354 may therefore save the imported or manually entered implant data to the specified MRI exam in order to define scanning protocols for the MRI scanner for the specified MRI exam. The implant data that is either imported or manually entered however may define or otherwise include configurations for multiple types of MRI exams, however. In this way, the implant data may be saved to the patient record and/or to the device database for further use for various types of MRI exams.

Turning now to FIG. 4, the first GUI 300 is shown with the second implant 324 of the implant list 320 selected. Each of the elements of the first GUI 300 may be similar to as described with respect to FIG. 3, except the implant information 326 and representations may correspond to the second implant (e.g., in the case presented, the second implant selected as sacral stimulator).

The available options for each parameter of the implant information 326 may correspond to the selected implant from the implant list 320. As an example, in FIG. 3 with the first implant 322 of the implant list 320 selected, a drop down menu of the selectable element 328 may show model numbers for various pacemakers (e.g., the first implant), but with the second implant 324 of the implant list 320 selected as shown in FIG. 4, a drop down menu of the selectable element 328 may show model numbers for various sacral stimulator devices (e.g., the second implant). In this way, selection and/or autopopulation of implants for a patient may automatically filter available options of implant information within the interface for each implant.

In some examples, a selected implant may have more than one configuration that has the same scan range as another configuration thereof. For example, a first configuration of the second implant of the patient 302 may have the same scan range as a second configuration of the second implant. A shaded area 410 corresponding to both the scan range of the first and second configurations may be overlaid on a representation 412 of the patient 302, similar to as described with respect to FIG. 3. In this way, the configurations, whether different or the same from one another, may be easily visualized by the user. Toggling between the first configuration element 338 and the second configuration element 340 may result in changes to the displayed MR equipment output conditioning parameters 342 based on the different configuration parameters.

In other examples, a selected implant may only have one configuration, in which case, a shaded area corresponding to the configuration may be displayed over a representation of the patient and MR equipment output conditioning parameters may be displayed as shown in both FIG. 3 and in FIG. 4, however the one configuration may always be selected via a configuration element (e.g., similar to first configuration element 338).

Referring now to FIG. 5, a second GUI 500 is shown. The second GUI 500 may be a pop-up window or interface that is displayed in response to user selection of the third save element 354 of the first GUI 300 indicating that the implant data, including type, parameters such as implanted position, model number, and so forth, and configurations (e.g., including each parameter configuration), are to be saved to the MRI scanner. The second GUI 500 may be displayed on the same display device as the first GUI 300. In some examples, the second GUI 500 may be displayed as a pop-up window on top of the first GUI 300, which may still be displayed underneath.

The second GUI 500 may display each implant of the patient 302 in a separate column. For example, a first implant column 502, a second implant column 504, and a third implant column 520 may be displayed within the second GUI 500. The first implant column 502 may correspond to the first implant 322 of the implant list 320 of the first GUI 300, the second implant column 504 may correspond to the second implant 324 of the implant list 320, and so on.

An implant parameter column 514 may also be displayed within the second GUI 500. The implant parameter column 514 may display a plurality of parameters in individual rows. Each of the parameters may be MRI scanner parameters that a corresponding implant demands. In the rows, a corresponding parameter configuration for a given implant configuration may be displayed within a respective column. For example, for a parameter 522 indicating the average effective RF magnet field generated by the RF transmit coil for a given pulse sequence (e.g., B1+RMS), a corresponding B1+RMS value for each configuration for each implant may be displayed within a respective column. For example, a first value 524 corresponding to a first configuration of the first implant is displayed in a first sub-column 506 of the first implant column 502, a second value 526 corresponding to a second configuration of the first implant is displayed in a second sub-column 508 of the first implant column 502, a third value 528 corresponding to a first configuration of the second implant is displayed in a first sub-column 510 of the second implant column 504, a fourth value 530 corresponding to a second configuration of the second implant is displayed in a second sub-column 512 of the second implant column 504, and a fifth value 532 corresponding to a first configuration of a third implant is displayed in the third implant column 520. In some examples, values in columns may be numerical, textual, or other indicating a respective parameter configuration.

The second GUI 500 may also display a recommendation configuration with a plurality of recommended parameter configurations in a recommendation column 540 that are based on the plurality of configurations of the one or more implants of the patient, as will be described with respect to FIG. 9. Each row in the recommendation column 540 may correspond to a parameter in the implant parameter column 514 similar to the columns and/or sub-columns described above. For example, a fifth value 546 may correspond to the parameter 522. In some examples, the fifth value 546 may be equal to a most conservative value in the row. For example, the fifth value 546 may be 2.8 and the available options for values of the row of the parameter 522 may be 2.8 or 3.2. 2.8 may be considered more conservative than 3.2 and may therefore be included in the recommendation configuration and displayed within the recommendation column 540, as will be further described with respect to FIG. 9.

One or more of the implant columns, such as first implant column 502 and second implant column 504, as well as the recommendation column 540 may include a save element. The first implant column 502 may include a first save element 550, the second implant column 504 may include a second save element 552, and the recommendation column 540 may include a third save element 554. A set of parameter configurations may be saved to the MRI scanner when a corresponding save element is selected. For example, the recommendation configuration may be saved to the MRI scanner in response to selection of the third save element 554. Selection of a particular set of parameter configurations may define MR equipment output conditioning parameters based on the set of parameter configurations. In some examples, selection of a save element corresponding to an implant may save all the implant configurations to the MRI scanner. Which of the implant configurations is used to determine MR operating conditions may be determined via another GUI, such as a GUI corresponding to the MRI scanner.

Further, the second GUI 500 may display the representations 336 and 412 of FIGS. 3 and 4, respectively, as well as highlighted shaded areas for given configurations, in corresponding sub-columns. As an example, for the first sub-column 506 of the first implant column 502 corresponding to the first configuration of the first implant, the representation 336 of the patient's body is displayed and the first shaded area 332 that corresponds to the first configuration is highlighted.

The recommendation configuration displayed in the recommendation column 540 may be editable via one of an edit element 542 and a reset element 544. The edit element 542, when selected, may allow a user to indicate chosen parameters via user input (e.g., mouse clicks or typing with a keyboard). The reset element 544 may result in a repeated determination of the parameter configurations of the recommendation configuration. The user may edit the recommendation configuration via the edit element 542 in such cases in which one or more of the parameter configurations may be changed. As an example, the recommendation configuration may recommend a B1+RMS (e.g., parameter 522) of 2.8 based on the various configurations of the implants of the patient, wherein 2.8 is the most conservative value presented corresponding to the second configuration of the first implant. However, the user may determine that a B1+RMS of 3.2 may be used instead when the ordered MRI exam has a scan range corresponding to the first configuration of the first implant and all other implants demand a B1+RMS of 3.2 as well. In this way, the shaded regions corresponding to scan range depicted with respective columns may aid the user in determining a configuration to use in determination of MR equipment output conditioning parameters.

Turning now to FIG. 6, a third GUI 600 is shown. The third GUI 600 may be displayed on a display device communicably coupled to an MRI scanner. In some examples, the display device on which the third GUI 600 is displayed may be the same display device upon which the first and second GUIs 300, 500 are displayed. In other examples, the display device on which the third GUI 600 is displayed may be a different display device than the display device on which the first and second GUIs 300, 500 are displayed. The third GUI 600 may be displayed in response to user selection of an MRI exam for a patient and/or in response to user selection of one of the save elements of the second GUI 500 (e.g., the first save element 550, the second save element 552, or the third save element 554).

The third GUI 600 may be a GUI for the MRI scanner to which the display device is coupled. The third GUI 600, as such, may display information relevant to the MRI scanner and the selected MRI exam. For example, scanner information 602 may be displayed within the third GUI 600. The scanner information 602 may include parameters such as normal field strength, nuclous being imaged, scanner type, and magnetic field orientation. Further, MR equipment output conditioning parameters 604 may be displayed within the third GUI 600 and may be based on or otherwise defined by a selected configuration from the second GUI 500. In examples in which multiple configurations of an implant are saved through the second GUI 500, configuration elements 606 may be displayed in the third GUI 600. The configuration elements 606, similar to the first and second configuration elements 338 and 340 of FIG. 3 may allow the user to toggle between the different configurations of the implant to select one of the configurations. In such examples, the MR equipment output conditioning parameters 604 may depend of the selected configuration element. The third GUI 600 may also display a representation 610 of the patient with relative positioning to the MRI scanner, where the MRI scanner is represented by a group of non-selectable elements 612.

The first and second GUIs 300, 500 may allow for determination and definition of the MR equipment output conditioning parameters 604 that are displayed within the third GUI 600 and may allow the user to more easily visualize the MR operating conditions that may affect the one or more implants of the patient. In this way, checks of relevant parameters for given implants may be made easier and more efficient, reducing time spent by MR personnel in double checking and cross referencing indicated parameters.

Referring now to FIG. 7, a flowchart illustrating a method 700 for generating MR operating conditions from obtained implant data is shown. The method 700 may be carried out using the systems and components described herein above with regard to FIGS. 1 and 2. For example, the method 700 may be carried out according to instructions stored in memory of one or more processors of a computing device, such as computing device 102, which is communicatively coupled to one or more display devices configured to display GUI(s), such as the first and second GUIs 300, 500. Further, the computing device via which the method 700 may be carried out may be communicatively coupled to an MRI scanner which may image a patient's body to acquire MRI images according to a set of MR equipment output conditioning parameters.

At 702, method 700 includes obtaining implant data for one or more implants of a patient. The implant data may comprise data specific to the type of implant, to the patient, and to configurations of the MRI scanner that correspond to the implant. For example, the data specific to the type of implant may comprise model number, company/manufacturer, etc., the data specific to the patient may comprise implant position within the body, date implanted, serial number, photos, etc., and the data specific to the configurations of the MRI scanner that correspond to the implant may comprise one or more sets of parameter configurations for the implant, wherein the parameters include various MRI scanner modes (e.g., dB/dt mode, SAR mode), scan range, spatial gradient, max slew rate, SAR (e.g., whole body and head), B1+RMS, max single series time, allowed FR transmit coils, and allowed RF drive mode.

The implant data may be stored in various sources. For example, the implant data may be stored in a patient record (e.g., EMR database), wherein the patient record is communicatively coupled to the computing device through which method 700 is executed, in a device database (e.g., implant database) that stores data of the implant not specific to the patient and is communicatively coupled to the computing device, and/or in other storage mediums not communicatively coupled to the computing device. The implant data may be obtained from one or more of the various sources. For example, the implant data may be obtained from the patient record as noted at 704, an implant database (e.g., a device database) as noted at 706, and/or from user inputs to a GUI, such as first GUI 300 of FIG. 3, as noted at 708. The GUI may display a plurality of implant information elements, which may either be autopopulated and/or manually selected via user inputs based on where the implant data is obtained from.

As an example, implant data obtained solely from the patient record may be autopopulated into the GUI and into memory of the computing device. In some examples, implant data may be obtained from more than one source. For example, implant data may be obtained from both the patient record and one or more implant databases. Implant data obtained from the device database may not include patient specific information and therefore a combination of autopopulation of data into the GUI and memory and manual input of data into the GUI and memory may be used. In some examples, a patient may have multiple implants wherein data of the implants is stored in more than one device database, as will be discussed with respect to FIG. 8. In such instances, data may be retrieved from the more than one device database and may be autopopulated into respective GUI elements and memory.

At 710, method 700 includes determining a plurality of configurations available for MRI scanner parameters based on the obtained implant data of the one or more implants. In some examples, a configuration may be a set of parameter configurations, including MRI parameters, such as modes, SAR, scan range, and the like as outlined above. Determining the plurality of configurations available may comprise determining one or more configurations for each implant, as noted at 712, and determining a recommendation configuration based on the one or more configurations for each implant, as noted at 714. Determination of the one or more configurations for each implant may be based on the obtained implant data. In some examples, implant data obtained from a database communicably coupled to the computing device, for example from an EMR database, may include one or more configurations for the corresponding implant. In other examples, configurations may be manually inputted by the user based on implant data acquired from an external database. As an example, implant data for a first type of implant, including configurations thereof, may be obtained from an external database and inputted manually via user inputs for a first patient. The implant data of the first type of implant may be saved to the computing device and then for a second patient, the implant data including the configurations may be obtained internally and autopopulated for the second patient. Determination of the recommendation configuration may comprise determining a most conservative parameter configuration among the implant configurations, as will be further described with respect to FIG. 9.

At 716, method 700 includes receiving user input selecting a configuration of the plurality of configurations. The plurality of configurations may be displayed in a GUI, in some examples the GUI that the implant data is displayed within and in other examples a different GUI, such as the second GUI 500 that is launched in response to user indication that the implant data is to be saved to the MRI scanner/exam. The GUI in which the plurality of configurations are displayed may also include save elements, as is described with respect to FIG. 5. User selection of one of the save elements may select the corresponding configuration. In some examples, more than one configuration may be selected when an implant is selected and the implant has more than one configurations thereof. In such examples, a second selection of one of the more than one configurations may be made through the GUI or another GUI, such as a GUI specific to the MRI scanner, e.g., third GUI 600.

At 718, method 700 includes determining MR equipment output conditioning parameters based on the selected configuration. The MR equipment output conditioning parameters (e.g., operating condition parameters) may include spatial gradient, gradient output (e.g., max slew rate), RF output (e.g., whole body SAR, head SAR, and B1+RMS), maximum single series time, allowed RF transmit coils, and/or allowed RF drive mode. The MR equipment output conditioning parameters may overlap with some of the implant data configuration parameters, and may therefore be based on the obtained implant data configuration and/or selected configuration.

At 720, method 700 includes importing the selected configuration and MR equipment output conditioning parameters to the MRI scanner. The selected configuration and the parameter configurations thereof may be imported to the MRI scanner in response to user selection of one of the save elements within the GUI and/or in response to selection of a particular implant configuration in the MRI GUI. The imported selected configuration and MR equipment output conditioning parameters may be specific to a particular MRI exam ordered for the patient. The MRI scanner may store the configuration and parameters for that particular MRI exam.

At 722, method 700 includes operating the MRI scanner according the MR equipment output conditioning parameters. As noted, the MR equipment output conditioning parameters define a set of parameters for the MRI scanner for acquiring images of the patient. The MRI scanner may be operated according to those parameters to acquire images of the patient within the demands of each implant the patient has for the particular MRI exam ordered.

In this way, acquisition of implant data and importation and use of that data to define MRI scanner parameters may be made more efficient and less cumbersome for MRI personnel. By providing a way for the implant data to be stored and imported into the MRI scanner automatically rather than only manually, time spent in searching for implant data and inserting that data into the system may be reduced.

Turning now to FIG. 8, a flowchart illustrating a method 800 for obtaining and saving data of multiple implants to a variety of databases is shown. The method 800 may be carried out using the systems and components described herein above with regard to FIGS. 1 and 2. For example, the method 800 may be carried out according to instructions stored in memory of one or more processors of a computing device, such as computing device 102, which is communicatively coupled to one or more display devices configured to display GUI(s), such as the first and second GUIs 300, 500. Further, the computing device via which the method 800 may be carried out may be communicatively coupled to an MRI scanner which may image a patient's body to acquire MRI images according to a set of MR equipment output conditioning parameters.

At 802, method 800 includes obtaining data of a first implant of a patient from a first database. In some examples, patients may have more than one implant wherein data of a subset of the implants is stored in a different database than another subset of the implants. For example, the first database may be specific to a manufacturer or company of the first implant, though other database types are possible. The first database may store data of the first implant in a first format. The first format may be a different format than is used by the computing device in communication with the MRI scanner that is to image the patient.

At 804, method 800 includes obtaining data of a second implant of the patient from a second database. As described above, patients may have more than one implant wherein data of implants is stored in different databases. The first and second databases may be device databases, EMR databases, or other external databases. For example, the second database may be specific to a second manufacturer or company that made the second implant. In some examples, the second database may store data of the second implant in a second format. The second format may be different than the first format and may a different format than is used by the computing device in communication MRI scanner that is to image the patient.

At 806, method 800 includes reformatting the data of the first and second implant. As noted both the first and second data formats may not be a format used by the computing device and as such, the data of the first and second implants may demand reformatting into a third format used by the computing device. As is described with respect to FIG. 2, a data format reconfiguration module of an intelligent protocolling system such as the intelligent protocolling system 200, may reformat data of various types into the format used by the computing device. In this way, the data of the implants when obtained from external sources may be converted into a useable format and analyzed to determine configurations of the first and second implants, as noted at 808. As described with respect to FIG. 7, the implant data may comprise a plurality of data, including data specific to the patient, data specific to the implant type, and data of one or more configurations (e.g., one or more sets of configurations) for parameters that may be met in order for the implant to be imaged by an MRI scanner. Following data reformatting, the configurations of both the first and second implants may be determined. The parameters of the configurations for both the first and second implants may be the same but the parameter configurations may differ, as is described with respect to FIG. 5.

At 810, method 800 includes displaying the implant data within a GUI, such as first GUI 300 of FIG. 3, on a display device. In some examples, the implant data that is displayed may include data of both the first and second implants. In other examples, the implant data that is displayed may include data of one of the first and second implants based on user selection of one of the implants from a list of implants of the patient.

At 812, method 800 includes receiving user input saving the implant data. As is described with respect to FIGS. 3 and 7, the GUI may comprise a plurality of save elements that when selected trigger storage of the implant data to one of a plurality of sources.

For example, user selection of a first save element (e.g., first save element 350 of FIG. 3) may trigger saving the implant data to a device database (e.g., an implant database). In some examples, when the implant data is obtained from external sources and inputted manually or obtained from a patient record (e.g., EMR), the data may be saved to the device database to be stored in non-transitory memory. In other examples, the implant data may be obtained from the device database, updated or otherwise edited, and then saved back to the device database with the updated information.

User selection of a second save element (e.g., second save element 352 of FIG. 3) may trigger saving the implant data to the patient record. In some examples, when the implant data is obtained from a device database and/or other external sources, the data may be saved to non-transitory memory of a connected EMR. In this way, the implant data may be connected to the patient record and easily accessible for further use, such as for subsequent MRI exams the patient may have. In other examples, similar to as described above, the implant data may be originally obtained from the patient record and may be updated and/or edited within the GUI. The updated implant data may then be saved back to the patient record.

In some examples, saving the implant data may be particular for one of the first and second implants. For example, within the GUI, either the first or second implant may be selected and data thereof may be displayed. Upon user selection of the first or second save element, data of the selected implant may be saved but data of the non-selected implant may not be saved. Selection of the first and/or second save elements may trigger saving of relevant implant data without a change to the displayed GUI.

User selection of a third save element (e.g., third save element 354 of FIG. 3) may indicate that the implant data is to be saved to the MRI scanner. Saving the implant data to the MRI scanner, as will be further described below, may include importing the data, including the configurations, and in particular a selected configuration, to the MRI scanner in order to define a set of MR equipment output conditioning parameters.

At 814, method 800 includes judging whether user input indicating the implant data is to be saved to the MRI scanner has been received. If user input indicates the implant data is to be saved to the MRI scanner, method 800 proceeds to 816. If user input indicates that the implant data is not to be saved to the MRI scanner, e.g., is saved to the device database, to the patient record, or is not saved at all, method 800 returns to 810 to continue displaying the GUI.

At 816, method 800 includes determining a recommendation configuration based on the reformatted data of the first and second implants. As will be further described with respect to FIG. 9, determining the recommendation configuration may comprise determining a parameter configuration for each parameter included in the implant data. In some examples, a second GUI may be launched in response to user selection of the third save element and configurations of the first and second implant as well as the recommendation configuration may be displayed in the second GUI (e.g., the second GUI 500 of FIG. 5). In other examples, the recommendation configuration may be displayed within the same GUI as the implant data is initially displayed in.

At 818, method 800 includes receiving user input selecting an implant configuration or the recommendation configuration. As noted, the implant data, including configuration data of each of the implants as well as the recommendation configuration (e.g., parameter configurations for each set of configurations) may be displayed within the GUI (e.g., the first GUI and/or the second GUI). The GUI may include save elements that when selected indicate that a configuration should be used. In some examples, a save element may correspond to a single configuration, such as the recommendation configuration. In other examples, a save element may correspond to an implant that comprises more than one configuration and when selected may indicate that either of the configurations may be used depending on the ordered MRI exam. An additional selection of one of the configurations of a selected implant may be made by the user in a separate GUI or in the same GUI.

At 820, method 800 includes saving the selected configuration to the MRI scanner. Saving the selected configuration to the MRI scanner may include saving an implant's multiple configurations, one of an implant's configurations, and/or the recommendation configuration, depending on which was selected. The selected configuration may define a set of MR equipment output conditioning parameters, as described above which may also be saved to the MRI scanner for the MRI exam when the selected configuration is saved. The MR equipment output conditioning parameters may be used when acquiring images of the patient with the MRI scanner.

In this way, data of various formats may be obtained, reformatted, and used by the computing device in defining implant configurations and MR operating conditions. The systems herein allow disparate data relevant to an MRI exam to be obtained from a variety of sources and altered into a usable format such that the data may be stored for future use and used to determine a recommended configuration of MRI settings. In this way, time spent in data collection and entry that previously has been an entirely manual process may be reduced. In turn, reducing time spent in implant data collection and in determining recommended configurations may allow MRI exams to be scheduled sooner, allowing the patient to receive diagnoses, evaluation, and the like in a more timely fashion.

Turning now to FIG. 9, a flowchart illustrating a method 900 for determining a recommendation configuration is shown. The method 900 may be carried out using the systems and components described herein above with regard to FIGS. 1 and 2. For example, the method 900 may be carried out according to instructions stored in memory of one or more processors of a computing device, such as computing device 102, which is communicatively coupled to one or more display devices configured to display GUI(s), such as the first and second GUIs 300, 500. Further, the computing device via which the method 900 may be carried out may be communicatively coupled to an MRI scanner which may image a patient's body to acquire MRI images according to a set of MR equipment output conditioning parameters. Method 900 may be executed as a portion of methods 700 and 800.

At 902, method 900 includes obtaining data of one or more implants of a patient. As described with respect to methods 700 and 800, data of one or more implants may be obtained from a variety of sources, individually or in combination. For example, implant data may be obtained from device database(s), the patient's record in an EMR database, and/or from external sources not in communication with the computing device via user inputs. The implant data may comprise data specific to the device, including model and manufacturer, data specific to the patient, including date implanted, location, etc., and one or more configurations for MRI scanners that may be used when acquiring MRI images with the device implanted in a patient. Each implant of the patient may have separate implant data that is obtained and processed together, as will be further described.

At 904, method 900 includes determining one or more configurations available and parameters thereof for each of the one or more implants. As discussed, implant data of each data may comprise data of one or more configurations for MRI scanners. The data of the one or more configurations may include a plurality of parameters, where each set of configuration for an implant includes a parameter configuration for each parameter. The parameters may include, as previously described, scan range, a plurality of modes, spatial gradient, SARs, and more.

At 906, method 900 includes determining, for each of the parameters, a most conservative parameter configuration. Each of the parameters may have a plurality of available values. The values may be a numerical value in a particular unit, a textual value, or other type of value assigned to the parameter for a given set of parameter configurations. "Most conservative" in this context, may indicate the parameter configuration that is encompassed within more options than any of the other configurations for that parameter among the presented sets of configurations.

As an example, for an allowed RF transmit coils parameter, which describes which RF transmit coils of the MRI scanner may be used when acquiring images so as to not interfere with or degrade the implant, two options for configurations may include 1) T/R Body, T/R Head, T/R Knee/Foot, and T/R Knee; and 2) T/R Body. The second option of T/R Body is encompassed within the first option, but not all of the first option is encompassed within the second option. Therefore, the second option may be considered more conservative and may be chosen for the recommendation configuration for that parameter. In such an example, one implant configuration may demand the second option of only T/R Body allowed and therefore the first option may not be viable for that implant and as such the second option may be used for the recommendation configuration.

As another example, for a B1+RMS parameter, which is measured in units of microtesla (µT), a first option for a configuration may be 3.2 T and a second option may be 2.8 T. The second option of 2.8 T may be encompassed within the first option of 3.2 T, but the first option of 3.2 T, being larger than 2.8 T, may not be wholly encompassed within the second option. As such, the second option may be chosen for the recommendation configuration for the B1+RMS parameter. Using the most conservative option for each of the parameters to determine the recommendation configuration allows each of the implant's demanded parameters to be met.

In some examples, one or more of the parameters may be specific to the ordered MRI exam and may be defined by user inputs prior to determination of the recommendation configuration. For example, scan range may depend on the type of exam and may therefore be autopopulated based on the type of exam.

At 908, method 900 includes generating a recommendation configuration including the most conservative configurations for each of the parameters. Once a most conservative configuration for each parameter is defined at 906, the set of parameter configurations that has been defined may be the recommendation configuration.

At 910, method 900 includes displaying each of the implant configurations and the recommendation configuration in a GUI. In some examples, the GUI may be displayed in response to user selection of a save element within another GUI, as is described with respect to FIGS. 3 and 5. The GUI may display the configuration in a chart with rows showing each parameter and columns showing configurations. In this way, the user may be able to easily visualize each available parameter configuration and compare them side by side. The recommendation configuration, as described with respect to FIG. 5 may be editable via user inputs if a different parameter configuration is desired than the one determined for one or more parameters. For example, in some examples a most conservative parameter configuration of a first parameter may be included in the recommendation configuration but may not correspond to the predetermined scan range. Therefore, the user may edit the recommendation configuration for the first parameter to match the predetermined scan range The method 900 may allow for more efficient determination of MRI scanner parameters when a patient has more than one implant. As implants may have different parameter demands, the recommendation configuration may combine the parameter demands of multiple implants into one configuration that meets the demands of all the implants. Such a method may reduce time spent by personnel in determining parameter configurations. Further, the recommendation configuration, or other selected configuration, may be imported to define MR operating conditions directly, therefore further reducing time spent by personnel in defining conditions of the scanner.

Referring now to FIG. 10, a flowchart illustrating a method 1000 for storing implant data is shown. The method 1000 may be carried out using the systems and components described herein above with regard to FIGS. 1 and 2. For example, the method 1000 may be carried out according to instructions stored in memory of one or more processors of a computing device, such as computing device 102, which is communicatively coupled to one or more display devices configured to display GUI(s), such as the first and second GUIs 300, 500. Further, the computing device via which the method 1000 may be carried out may be communicatively coupled to an MRI scanner which may image a patient's body to acquire MRI images according to a set of MR equipment output conditioning parameters.

At 1002, method 1000 includes obtaining implant data for one or more implants of a patient. As is described above, the implant data may comprise data specific to the type of implant, to the patient, and to configurations of the MRI scanner that correspond to the implant. For example, the data specific to the type of implant may comprise model number, company/manufacturer, etc., the data specific to the patient may comprise implant position within the body, date implanted, serial number, photos, etc., and the data specific to the configurations of the MRI scanner that correspond to the implant may comprise one or more sets of parameter configurations for the implant, wherein the parameters include various modes (scan range, spatial gradient, SARs, and the like as previously described.

The implant data may be obtained from various sources. For example, the implant data may be obtained from an EMR database, as noted at 1004, wherein the patient record is communicatively coupled to the computing device through which method 1000 is executed, from an implant database, as noted at 1006, which stores data of the implant not specific to the patient and is communicatively coupled to the computing device, and/or in other storage mediums not communicatively coupled to the computing device wherein data is obtained via user inputs, as noted at 1008.

At 1010, method 1000 includes displaying implant of each of the one or more implants in a GUI. The GUI may display implant information and a representation of the patient with scan range depicted as a shaded area overlaid on the representation of the patient for a selected implant. As is described previously, each implant may comprise one or more configurations, in some examples wherein one or more parameters differ therebetween based on scan range configuration. For example, a first implant may be selected within the GUI and relevant implant information may be displayed alongside the representation of the patient. A first configuration of scanner parameters may be selected for the first implant and a shaded region may be overlaid over the representation of the patient indicating the scan range of the first configuration. The GUI may further include a plurality of save elements, as is described with respect to FIGS. 3 and 8. The plurality of save elements may include a device database save element, an EMR save element, and a MRI scanner save element.

At 1012, method 1000 includes receiving input to save the implant data. The implant data may include, in some examples, data of one of the one or more implants, or, in other examples, data of more than one of the one or more implants. User input may comprise user selection of one of the plurality of save elements, for example via a user input device like a mouse or trackpad.

At 1014, method 1000 includes judging whether the input indicates that the implant data is to be saved to the implant database. If yes, method 1000 proceeds to 1020. If no, method 1000 proceeds to 1016 to determine whether the implant data is to be saved to the EMR database.

At 1020, method 1000 includes saving a first subset of the implant data to a corresponding implant database. As noted, the implant data for a selected implant includes data specific to the implant type, data specific to the patient, and data of configurations of allowed scanner parameters. The first subset of the implant data may comprise the data specific to the implant type, including model number, manufacturer/company, and the like, and the data of configurations of allowed scanner parameters. In some examples, a first subset of data may be saved for a first implant to a first device database and a first subset of data of a second implant may be saved to a second device database. In this way, the data that is saved to the device database(s) may not include any patient-specific information so as to comply with patient privacy.

At 1016, method 1000 judging whether the input indicates that the implant data is to be saved to the EMR database. If yes, method 1000 proceeds to 1022. If no, method 1000 proceeds to 1018 to save implant data to MRI scanner and generate a recommendation configuration.

At 1022, method 1000 includes saving a second subset of the implant data to the EMR database. The second subset of the implant data, in some examples, may include implant type data and patient specific data. In other examples, the second subset of the implant data may include all the data, including the implant type data, the patient specific data, and the configurations data. Saving the implant data to the EMR database may comprise saving implant data of one or more of the one or more implants.

Implant data may be saved to more than one database. For example a first user input may indicate that the first subset of the implant data for the first implant is to be saved to the corresponding device database and a second user input may indicate that the second subset of the implant data for the first implant is to be saved to the EMR database. When saved to the EMR database and/or the device databases, the implant data may be accessible later for subsequent MRI exams. As an example, for a first MRI exam, implant data may initially be obtained from an external source not connected to the computing device and inputted via user inputs. The implant data may then be saved to the corresponding device database and the EMR database. The implant data may also, in some examples, later be used to determine operating conditions of the MRI scanner for the first MRI exam. Then, at a later time, for a second MRI exam, the implant data may be obtained from one or both of the device database and the EMR database and may be autopopulated to generate the operating conditions of the MRI scanner. In this way, the time spent in data retrieval and processing may be reduced as the implant data may only need to be obtained from external sources (e.g., external databases) not connected to the computing system, and therefore obtained via manual inputs.

At 1018, method 1000 includes saving implant data to the MRI scanner and generating a recommendation configuration. If the user input indicating that the implant data is to be saved does not indicate that the implant data is to be saved to either the implant database or to the EMR database, the implant database is therefore to be saved to the MRI scanner for a given MRI exam that has been ordered. As described with respect to FIGS. 7-9, user selection of the MRI scanner save element may trigger generation of the recommendation configuration.

At 1024, method 1000 includes launching a second user interface for selection of a configuration. As described with respect to FIGS. 5 and 9, selection of the MRI scanner save element may trigger both determination of the recommendation configuration and launch of a second GUI that displays each configuration of each implant of the patient and the recommendation configuration. From within the second GUI, a configuration may be selected as the configuration that is to be used for the MRI exam.

At 1026, method 1000 includes determining MRI operating conditions based on the selected configuration in response to selection of one of the configurations. The configurations, as previously described, may define a plurality of scanner parameters. The MRI operating conditions, or MR equipment output conditioning parameters, may be directly defined by the plurality of scanner parameters of the selected configuration. In this way, MRI operating conditions may be more efficiently determined for patients who have MR conditional implants.

The technical effect of the methods and systems herein disclosed is that data storage, retrieval, and reformatting may be more efficient for users. In particular, the systems and methods allow data of multiple implants to be obtained from various sources and saved to various sources, in some examples in combination, to allow the user to more efficiently obtain a plurality of data types of multiple implants. Further, data of various formats may be obtained and reformatted into a different in order to be made usable by the system. Determining a recommendation configuration based on parameter configurations of multiple implants may reduce time spent by MR personnel in determining operating conditions. Time spent in data collection and entry that previously has been an entirely manual process may be reduced. In turn, reducing time spent in implant data collection and in determining recommended configurations may allow MRI exams to be scheduled sooner, allowing the patient to receive diagnoses, evaluation, and the like in a more timely fashion.

The disclosure also provides support for a method, comprising: obtaining data of one or more implants of a patient from one or more sources, determining one or more configurations of each of the one or more implants, displaying, via a graphical user interface (GUI), the data and the one or more configurations, determining a recommendation configuration based on the one or more configurations, determining a selected configuration via user input to the GUI, and determining operating conditions of an MRI scanner based on the selected configuration for an MRI exam. In a first example of the method, the method further comprises: directly transferring the operating conditions to the MRI scanner and operating the MRI scanner according to the operating conditions to acquire images of the patient. In a second example of the method, optionally including the first example, the one or more sources comprise at least one of one or more implant databases, an electronic medical record (EMR) database, and one or more external sources. In a third example of the method, optionally including one or both of the first and second examples, obtaining data from one or more external sources comprises inputting data to the GUI via user inputs. In a fourth example of the method, optionally including one or more or each of the first through third examples, each of the one or more configurations of each of the one or more implants comprise a set of parameter configurations comprising a configuration for each of a plurality of parameters and wherein the recommendation configuration comprises a parameter configuration for each of the plurality of parameters. In a fifth example of the method, optionally including one or more or each of the first through fourth examples, determining the recommendation configuration comprises determining a most conservative parameter for each of the plurality of parameters among the one or more configurations available. In a sixth example of the method, optionally including one or more or each of the first through fifth examples, the operating conditions of the MRI scanner comprise a plurality of MR equipment output conditioning parameters. In a seventh example of the method, optionally including one or more or each of the first through sixth examples, the method further comprises: saving the data to at least one of one or more implant databases and an EMR database.

The disclosure also provides support for a system, comprising, a computing device communicatively coupled to a magnetic resonance imaging (MRI) scanner configured to acquire MR images of a patient, the computing device coupled to one or more databases and at least one display device, wherein the computing device is configured with instructions stored in non-transitory memory that when executed by a processor cause the computing device to: obtain first implant data of a first implant from a first database, wherein the first database stores the first implant data in a first format, obtain second implant data of a second implant from a second database, wherein the second database stores the second implant data in a second format, wherein the first and second implant data each comprise one or more configurations each comprising a set of parameter configurations, reformat the first and second implant data into a third format, wherein the third format is usable by the computing device and MRI scanner, determine a recommendation configuration, wherein the recommendation configuration comprises a recommended set of parameter configurations based on parameters of the one or more configurations of the first and second implant data, and generate MR equipment output conditioning parameters based on one of the one or more configurations and the recommendation configuration. In a first example of the system, the computing device is further configured with instructions that when executed cause the computing device to operate the MRI scanner to acquire images of the patient according to the MR equipment output conditioning parameters. In a second example of the system, optionally including the first example, determining the recommendation configuration comprises determining a most conservative parameter configuration among respective sets of parameter configurations of the first and second implant data for each of a plurality of parameters. In a third example of the system, optionally including one or both of the first and second examples, the recommendation configuration is determined in response to user selection of a save element indicating that at least one of the first and second implant data is to be saved to the MRI scanner for a particular MRI exam. In a fourth example of the system, optionally including one or more or each of the first through third examples, the device databases and the EMR database are communicatively coupled to the computing device and the external databases are not communicatively coupled to the computing device. In a fifth example of the system, optionally including one or more or each of the first through fourth examples, the computing device is configured with further instructions that when executed cause the processor to save at least one of the first implant data and the second implant data to a corresponding device database in response to user selection of a first save element displayed within a GUI displayed on the at least one display device. In a sixth example of the system, optionally including one or more or each of the first through fifth examples, the computing device is configured with further instructions that when executed cause the processor to save at least one of the first implant data and the second implant data to an EMR database corresponding to the patient in response to user selection of a second save element displayed within a GUI displayed on the at least one display device. In a seventh example of the system, optionally including one or more or each of the first through sixth examples, saving at least one of the first implant data and the second implant data to the corresponding device database comprises saving a subset of respective data that excludes patient specific data. In a eighth example of the system, optionally including one or more or each of the first through seventh examples, the recommendation configuration is displayed within a first GUI that comprises a third save element that, when selected via user input, launches a second GUI displaying parameters of the one or more configurations of the first and second implant data and the recommendation configuration, wherein the second GUI comprises one or more save elements that when selected trigger saving data of a corresponding configuration to the MRI scanner.

The disclosure also provides support for a method, comprising: obtaining implant data of one or more implants of a first patient from one or more databases including one or more device databases, an electronic medical record (EMR database), and one or more external sources, determining parameter configurations for a plurality of parameters of one or more configurations of each of the one or more implants, determining a most conservative parameter configuration of each of the plurality of parameters to generate a recommendation configuration in response to user input to a first graphical user interface (GUI), display, within a second GUI, the one or more configurations of each of the one or more implants and the recommendation configuration, selecting a selected configuration of the one or more configurations and the recommendation configuration via user input, determining magnetic resonance (MR) equipment output conditioning parameters of an MR scanner based on the selected configuration, and acquiring images of the patient with the MR scanner according to the MR equipment output conditioning parameters. In a first example of the method, the method further comprises: saving a first subset of the implant data to a corresponding device database in response to user selection of a device database save element within the GUI, wherein the first subset excludes patient specific data of the first patient, and saving a second subset of the implant data to a corresponding patient record in response to user selection of an EMR save element within the GUI, wherein the second subset includes patient specific data of the first patient. In a second example of the method, optionally including the first example, the method further comprises: obtaining the first subset of the implant data for an implant of a second patient.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    obtaining data of one or more implants of a patient from one or more sources;
    determining one or more configurations of each of the one or more implants, wherein each of the one or more configurations of each of the one or more implants comprises a set of parameter configurations comprising a configuration for each of a plurality of parameters;
    displaying, via a graphical user interface (GUI), the data and the one or more configurations;
    determining a recommendation configuration based on the one or more configurations, and wherein the recommendation configuration comprises a parameter configuration for each of the plurality of parameters;
    determining a selected configuration via user input to the GUI; and
    determining operating conditions of a magnetic resonance imaging (MRI) scanner based on the selected configuration for an MRI exam, wherein the operating conditions of the MRI scanner comprise a plurality of MR equipment output conditioning parameters.

2. The method of claim 1, further comprising directly transferring the operating conditions to the MRI scanner and operating the MRI scanner according to the operating conditions to acquire images of the patient.

3. The method of claim 1, wherein the one or more sources comprise at least one of one or more implant databases, an electronic medical record (EMR) database, and one or more external sources.

4. The method of claim 3, wherein obtaining data from one or more external sources comprises inputting data to the GUI via user inputs.

5. The method of claim 1, wherein determining the recommendation configuration comprises determining a most conservative parameter for each of the plurality of parameters among the one or more configurations available.

6. The method of claim 1, further comprising saving user inputted data to at least one of one or more implant databases and an EMR database.

7. A system, comprising,
    a computing device communicatively coupled to a magnetic resonance imaging (MRI) scanner configured to acquire MR images of a patient, the computing device coupled to one or more databases and at least one display device, wherein the computing device is configured with instructions stored in non-transitory memory that when executed by a processor cause the computing device to:
        obtain first implant data of a first implant from a first database, wherein the first database stores the first implant data in a first format;
        obtain second implant data of a second implant from a second database, wherein the second database stores the second implant data in a second format, wherein the first and second implant data each comprise one or more configurations each comprising a set of parameter configurations;

reformat the first and second implant data into a third format, wherein the third format is usable by the computing device and MRI scanner;

determine a recommendation configuration, wherein the recommendation configuration comprises a recommended set of parameter configurations based on parameters of the one or more configurations of the first and second implant data; and generate MR equipment output conditioning parameters based on one of the one or more configurations and the recommendation configuration.

8. The system of claim 7, wherein the computing device is further configured with instructions that when executed cause the computing device to operate the MRI scanner to acquire images of the patient according to the MR equipment output conditioning parameters.

9. The system of claim 7, wherein determining the recommendation configuration comprises determining a most conservative parameter configuration among respective sets of parameter configurations of the first and second implant data for each of a plurality of parameters.

10. The system of claim 7, wherein the recommendation configuration is determined in response to user selection of a save element indicating that at least one of the first and second implant data is to be saved to the MRI scanner for a particular MRI exam.

11. The system of claim 10, wherein the device databases and the EMR database are communicatively coupled to the computing device and the external databases are not communicatively coupled to the computing device.

12. The system of claim 7, wherein the computing device is configured with further instructions that when executed cause the processor to save at least one of the first implant data and the second implant data to a corresponding device database in response to user selection of a first save element displayed within a GUI displayed on the at least one display device.

13. The system of claim 12, wherein saving at least one of the first implant data and the second implant data to the corresponding device database comprises saving a subset of respective data that excludes patient specific data.

14. The system of claim 7, wherein the computing device is configured with further instructions that when executed cause the processor to save at least one of the first implant data and the second implant data to an EMR database corresponding to the patient in response to user selection of a second save element displayed within a GUI displayed on the at least one display device.

15. The system of claim 7, wherein the recommendation configuration is displayed within a first GUI that comprises a third save element that, when selected via user input, launches a second GUI displaying parameters of the one or more configurations of the first and second implant data and the recommendation configuration, wherein the second GUI comprises one or more save elements that when selected trigger saving data of a corresponding configuration to the MRI scanner.

16. A method, comprising:

obtaining implant data of one or more implants of a first patient from one or more databases including one or more device databases, an electronic medical record (EMR) database, and one or more external sources;

determining parameter configurations for a plurality of parameters of one or more configurations of each of the one or more implants;

determining a most conservative parameter configuration of each of the plurality of parameters to generate a recommendation configuration in response to user input to a first graphical user interface (GUI);

display, within a second GUI, the one or more configurations of each of the one or more implants and the recommendation configuration;

selecting a selected configuration of the one or more configurations and the recommendation configuration via user input;

determining magnetic resonance (MR) equipment output conditioning parameters of an MR scanner based on the selected configuration; and acquiring images of the patient with the MR scanner according to the MR equipment output conditioning parameters.

17. The method of claim 16, further comprising:

saving a first subset of the implant data to a corresponding device database in response to user selection of a device database save element within the GUI, wherein the first subset excludes patient specific data of the first patient; and saving a second subset of the implant data to a corresponding patient record in response to user selection of an EMR save element within the GUI, wherein the second subset includes patient specific data of the first patient.

18. The method of claim 17, further comprising obtaining the first subset of the implant data for an implant of a second patient.

* * * * *